United States Patent
Zettel, II et al.

(10) Patent No.: US 11,762,668 B2
(45) Date of Patent: Sep. 19, 2023

(54) CENTRALIZED CONFIGURATION DATA MANAGEMENT AND CONTROL

(71) Applicant: ServiceNow, Inc., Santa Clara, CA (US)

(72) Inventors: Kurt Joseph Zettel, II, Nashville, TN (US); Filip Deryckere, Brussels (BE); Joshua Jayson Goldstein, Agoura Hills, CA (US); Mark Jason Harun, Brussels (BE); Tal Kapon, Petah Tikva (IL); Alessandro Buzzatti, San Francisco, CA (US); Michael Steven Ludwig, Novi, MI (US); Ravindra Bansal, Santa Clara, CA (US); Benny Van de Sompele, Brussels (BE); Swapnesh Patel, Kirkland, WA (US)

(73) Assignee: ServiceNow, Inc., Santa Clara, CA (US)

(*) Notice: Subject to any disclaimer, the term of this patent is extended or adjusted under 35 U.S.C. 154(b) by 232 days.

(21) Appl. No.: 17/368,568

(22) Filed: Jul. 6, 2021

(65) Prior Publication Data
US 2023/0019705 A1   Jan. 19, 2023

(51) Int. Cl.
*G06F 9/24* (2006.01)
*G06F 9/445* (2018.01)
(Continued)

(52) U.S. Cl.
CPC ...... *G06F 9/44505* (2013.01); *G06F 16/2365* (2019.01); *G06F 9/4401* (2013.01)

(58) Field of Classification Search
CPC ..... G06F 9/44505; G06F 16/2365; G06F 8/71
(Continued)

(56) References Cited

U.S. PATENT DOCUMENTS

| 4,941,084 A | 7/1990 | Terada et al. |
| 5,185,860 A | 2/1993 | Wu |

(Continued)

FOREIGN PATENT DOCUMENTS

| EP | 0433979 | 6/1991 |
| EP | P1607824 | 12/2005 |

(Continued)

OTHER PUBLICATIONS

ServiceNow, Quebec DevOps, downloaded from Internet, Jun. 17, 2021.

(Continued)

*Primary Examiner* — Volvick Derose
(74) *Attorney, Agent, or Firm* — McDonnell Boehnen Hulbert & Berghoff LLP

(57) ABSTRACT

Persistent storage may be arranged to store sets of configuration data respectively corresponding to applications. One or more processors of a computational instance may be configured to: receive, from a data source, a set of configuration data corresponding to an application deployable on a network related to the computational instance, wherein the set of configuration data defines components, packages, and environments, wherein the packages include one or more of the components, and wherein the environments include one or more of the packages; write, to the persistent storage, a representation of the set of configuration data; look up one or more policies applicable to the set of configuration data; and validate, by a policy engine, the set of configuration data by applying the one or more policies to the set of configuration data.

19 Claims, 14 Drawing Sheets

(51) Int. Cl.
    *G06F 16/23* (2019.01)
    *G06F 9/4401* (2018.01)

(58) Field of Classification Search
    USPC .......................................................... 713/1
    See application file for complete search history.

(56) References Cited

U.S. PATENT DOCUMENTS

| | | | |
|---|---|---|---|
| 5,237,518 A | 8/1993 | Sztipanovits et al. | |
| 5,261,097 A | 11/1993 | Saxon | |
| 5,265,252 A | 11/1993 | Rawson, III et al. | |
| 5,367,685 A | 11/1994 | Gosling | |
| 5,390,297 A | 2/1995 | Barber et al. | |
| 5,442,791 A | 8/1995 | Wrabetz et al. | |
| 5,452,415 A | 9/1995 | Hotka | |
| 5,522,042 A | 5/1996 | Fee et al. | |
| 5,533,116 A | 7/1996 | Vesterinen | |
| 5,655,081 A | 8/1997 | Bonnell et al. | |
| 5,659,736 A | 8/1997 | Hasegawa et al. | |
| 5,671,412 A | 9/1997 | Christiano | |
| 5,696,701 A | 12/1997 | Burgess et al. | |
| 5,715,463 A | 2/1998 | Merkin | |
| 5,745,879 A | 4/1998 | Wyman | |
| 5,761,502 A | 6/1998 | Jacobs | |
| 5,764,913 A | 6/1998 | Jancke et al. | |
| 5,887,139 A | 3/1999 | Madison, Jr. et al. | |
| 5,909,217 A | 6/1999 | Bereiter | |
| 5,937,165 A | 8/1999 | Schwaller et al. | |
| 5,949,976 A | 9/1999 | Chappelle | |
| 5,978,594 A | 11/1999 | Bonnell et al. | |
| 6,021,437 A | 2/2000 | Chen et al. | |
| 6,041,347 A | 3/2000 | Harsham et al. | |
| 6,088,717 A | 7/2000 | Reed et al. | |
| 6,101,500 A | 8/2000 | Lau | |
| 6,128,016 A | 10/2000 | Coelho et al. | |
| 6,131,118 A | 10/2000 | Stupek, Jr. et al. | |
| 6,134,581 A | 10/2000 | Ismael et al. | |
| 6,138,122 A | 10/2000 | Smith et al. | |
| 6,148,335 A | 11/2000 | Haggard et al. | |
| 6,151,604 A | 11/2000 | Wlaschin et al. | |
| 6,163,775 A | 12/2000 | Wlaschin et al. | |
| 6,166,732 A | 12/2000 | Mitchell et al. | |
| 6,167,448 A | 12/2000 | Hemphill et al. | |
| 6,175,866 B1 | 1/2001 | Holloway et al. | |
| 6,175,878 B1 | 1/2001 | Seaman et al. | |
| 6,260,050 B1 | 7/2001 | Yost et al. | |
| 6,263,457 B1 | 7/2001 | Anderson et al. | |
| 6,272,150 B1 | 8/2001 | Hrastar et al. | |
| 6,336,138 B1 | 1/2002 | Caswell et al. | |
| 6,363,421 B2 | 3/2002 | Barker et al. | |
| 6,393,386 B1 | 5/2002 | Zager et al. | |
| 6,397,245 B1 | 5/2002 | Johnson, II et al. | |
| 6,434,626 B1 | 8/2002 | Prakash et al. | |
| 6,438,592 B1 | 8/2002 | Killian | |
| 6,456,306 B1 | 9/2002 | Chin et al. | |
| 6,466,932 B1 | 10/2002 | Dennis et al. | |
| 6,487,590 B1 | 11/2002 | Foley et al. | |
| 6,505,248 B1 | 1/2003 | Casper et al. | |
| 6,526,442 B1 | 2/2003 | Stupek, Jr. et al. | |
| 6,621,823 B1 | 9/2003 | Mellquist et al. | |
| 6,707,795 B1 | 3/2004 | Noorhosseini et al. | |
| 6,742,015 B1 | 5/2004 | Bowman-Amuah | |
| 6,763,380 B1 | 7/2004 | Mayton et al. | |
| 6,816,898 B1 | 11/2004 | Scarpelli et al. | |
| 6,836,794 B1 * | 12/2004 | Lucovsky | G06F 8/61 |
| | | | 717/177 |
| 6,895,586 B1 | 5/2005 | Brasher et al. | |
| 6,948,175 B1 | 9/2005 | Fong et al. | |
| 6,985,901 B1 | 1/2006 | Sachse et al. | |
| 7,003,564 B2 | 2/2006 | Greuel et al. | |
| 7,028,228 B1 | 4/2006 | Lovy et al. | |
| 7,043,537 B1 | 5/2006 | Pratt | |
| 7,043,661 B2 | 5/2006 | Valadarsky et al. | |
| 7,062,683 B2 | 6/2006 | Warpenburg et al. | |
| 7,096,459 B2 | 8/2006 | Keller et al. | |
| 7,146,574 B2 | 12/2006 | Goldthwaite et al. | |
| 7,197,466 B1 | 3/2007 | Peterson et al. | |
| 7,215,360 B2 | 5/2007 | Gupta | |
| 7,216,304 B1 | 5/2007 | Gourdol et al. | |
| 7,222,147 B1 | 5/2007 | Black et al. | |
| 7,281,170 B2 | 10/2007 | Taylor et al. | |
| 7,412,502 B2 | 8/2008 | Fearn et al. | |
| 7,505,872 B2 | 3/2009 | Keller et al. | |
| 7,593,013 B2 | 9/2009 | Agutter et al. | |
| 7,596,716 B2 | 9/2009 | Frost et al. | |
| 7,617,073 B2 | 11/2009 | Trinon et al. | |
| 7,660,731 B2 | 2/2010 | Chaddha et al. | |
| 7,676,294 B2 | 3/2010 | Baier et al. | |
| 7,676,437 B2 | 3/2010 | Satkunanathan et al. | |
| 7,840,490 B1 | 11/2010 | Sellers et al. | |
| 7,877,783 B1 | 1/2011 | Cline et al. | |
| 7,890,869 B1 | 2/2011 | Mayer et al. | |
| 7,908,348 B2 * | 3/2011 | Kumar | G06F 9/451 |
| | | | 709/224 |
| 7,966,398 B2 | 6/2011 | Wiles, Jr. | |
| 8,060,396 B1 | 11/2011 | Bessler et al. | |
| 8,196,210 B2 | 6/2012 | Sterin | |
| 8,321,948 B2 | 11/2012 | Robinson et al. | |
| 8,407,669 B2 | 3/2013 | Yee et al. | |
| 8,554,750 B2 | 10/2013 | Rangarajan et al. | |
| 8,595,647 B2 | 11/2013 | Sabin et al. | |
| 8,620,818 B2 | 12/2013 | Hughes et al. | |
| 8,646,093 B2 | 2/2014 | Myers et al. | |
| 8,674,992 B2 | 3/2014 | Poston et al. | |
| 8,725,647 B2 | 5/2014 | Disciascio et al. | |
| 9,053,460 B2 | 6/2015 | Gilbert et al. | |
| 9,560,079 B1 * | 1/2017 | Lucovsky | H04L 63/10 |
| 9,645,815 B2 * | 5/2017 | Bennah | G06F 11/3051 |
| 10,673,963 B1 | 6/2020 | Feiguine et al. | |
| 10,749,943 B1 | 8/2020 | Eiguine et al. | |
| 10,771,344 B2 | 9/2020 | Bitterfeld et al. | |
| 10,824,650 B2 | 11/2020 | Bar Oz et al. | |
| 10,944,654 B2 | 3/2021 | Rimar et al. | |
| 11,240,329 B1 * | 2/2022 | Jain | G16H 20/10 |
| 2002/0116340 A1 | 8/2002 | Hellberg et al. | |
| 2002/0133584 A1 | 9/2002 | Greuel et al. | |
| 2002/0158969 A1 | 10/2002 | Gupta | |
| 2003/0118087 A1 | 6/2003 | Goldthwaite et al. | |
| 2003/0182656 A1 * | 9/2003 | Leathers | G06F 8/60 |
| | | | 717/177 |
| 2003/0200293 A1 | 10/2003 | Fearn et al. | |
| 2005/0015217 A1 | 1/2005 | Weidl et al. | |
| 2005/0091356 A1 | 4/2005 | Izzo | |
| 2006/0026453 A1 | 2/2006 | Frost et al. | |
| 2006/0095461 A1 | 5/2006 | Raymond | |
| 2006/0179058 A1 | 8/2006 | Bram et al. | |
| 2006/0293942 A1 | 12/2006 | Chaddha et al. | |
| 2007/0033279 A1 | 2/2007 | Battat et al. | |
| 2007/0188494 A1 | 8/2007 | Agutter et al. | |
| 2007/0288389 A1 | 12/2007 | Vaughan et al. | |
| 2008/0133289 A1 | 6/2008 | Armour et al. | |
| 2008/0148253 A1 | 6/2008 | Badwe et al. | |
| 2008/0319779 A1 | 12/2008 | Hughes et al. | |
| 2009/0083398 A1 * | 3/2009 | Ford | G06F 15/177 |
| | | | 709/220 |
| 2009/0088875 A1 | 4/2009 | Baier et al. | |
| 2009/0228984 A1 | 9/2009 | Sterin | |
| 2010/0110932 A1 | 5/2010 | Doran et al. | |
| 2010/0180270 A1 * | 7/2010 | Williams | G06F 8/65 |
| | | | 717/174 |
| 2011/0145789 A1 * | 6/2011 | Rasch | G06F 9/44505 |
| | | | 717/121 |
| 2013/0117424 A1 * | 5/2013 | Colyer | G06F 9/44505 |
| | | | 709/221 |
| 2014/0280805 A1 * | 9/2014 | Sawalha | G06F 9/5072 |
| | | | 709/222 |
| 2015/0347173 A1 * | 12/2015 | Shen | G06F 9/5077 |
| | | | 718/1 |
| 2016/0357424 A1 * | 12/2016 | Pang | G06F 16/137 |
| 2017/0048170 A1 | 2/2017 | Smullen et al. | |
| 2017/0289069 A1 | 10/2017 | Plumb et al. | |
| 2018/0026919 A1 | 1/2018 | Gau et al. | |
| 2018/0123940 A1 | 5/2018 | Rimar et al. | |

(56) References Cited

U.S. PATENT DOCUMENTS

| | | |
|---|---|---|
| 2018/0227175 A1* | 8/2018 | Lederer .................. H04L 67/10 |
| 2019/0104398 A1 | 4/2019 | Owen et al. |
| 2019/0173811 A1 | 6/2019 | Estrada et al. |
| 2019/0207875 A1 | 7/2019 | Youssefi |
| 2019/0349321 A1 | 11/2019 | Cai et al. |
| 2020/0050689 A1 | 2/2020 | Tal et al. |
| 2020/0204443 A1 | 6/2020 | Bar Oz et al. |
| 2022/0179946 A1* | 6/2022 | Parameshwaran .......................... G06F 21/6209 |
| 2023/0019705 A1* | 1/2023 | Zettel, II ............. G06F 16/2365 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

OTHER PUBLICATIONS

U.S. Appl. No. 16/898,758, filed Jun. 11, 2020, 60 pages.
Non-Final Office Action dated Aug. 11, 2021, issued in U.S. Appl. No. 16/898,758, filed Jun. 11, 2020, 25 pages.

\* cited by examiner

CENTRALIZED CONFIGURATION DATA MANAGEMENT AND CONTROL

BACKGROUND

Configuration data management refers to groupings of data and policies that specify how certain computing devices, applications, and/or services are expected to operate. In some cases, the data may take the form of software configurations, and the policies may include one or more rules with which the configurations should conform. As networks deploy larger numbers of services, and these services become more complex, configuration data management becomes increasingly important. Not only are individual computing devices, applications, and/or services becoming complicated with more configurable parameters (and thus more opportunities for misconfiguration), but the number of such computing devices, applications, and/or services is also growing. For instance, some networks may deploy hundreds of loosely-coupled microservices, combinations of which can be used to build distributed applications or higher-layer services. Thus, the misconfiguration of a single one of these microservices can potentially prevent numerous applications from operating correctly or at all.

SUMMARY

The embodiments herein overcome these and possible other disadvantages of conventional systems by facilitating centralized configuration data management. Particularly, a configuration data management software tool can ingest configuration data from multiple configuration sources (e.g., configuration files, build tools, etc.), and represent this data in application-independent fashion. Policies can be applied to the configuration data to validate that it is properly formed and consistent with any pre-defined requirements. Validated configuration data can be tagged and versioned, and also can be exported to various formats supported by the configuration sources. A new form of database table may be used to represent the configuration data so that versions can be easily and efficiently stored and searched.

Accordingly, a first example embodiment may involve persistent storage arranged to store sets of configuration data respectively corresponding to applications. The first example embodiment may further involve one or more processors of a computational instance configured to: receive, from a data source, a set of configuration data corresponding to an application deployable on a network related to the computational instance, wherein the set of configuration data defines components, packages, and environments, wherein the packages include one or more of the components, and wherein the environments include one or more of the packages; write, to the persistent storage, a representation of the set of configuration data; look up one or more policies applicable to the set of configuration data; validate, by a policy engine, the set of configuration data by applying the one or more policies to the set of configuration data; possibly in response to validating the set of configuration data, mark, in the persistent storage, a snapshot of the set of configuration data; and export, from the persistent storage, a version of the set of configuration data as marked by the snapshot.

A second example embodiment may involve receiving, from a data source, a set of configuration data corresponding to an application deployable on a network, wherein the set of configuration data defines components, packages, and environments, wherein the packages include one or more of the components, and wherein the environments include one or more of the packages. The second example embodiment may also involve writing, to persistent storage, a representation of the set of configuration data. The second example embodiment may also involve looking up one or more policies applicable to the set of configuration data. The second example embodiment may also involve validating, by a policy engine, the set of configuration data by applying the one or more policies to the set of configuration data. The second example embodiment may also involve, possibly in response to validating the set of configuration data, marking, in the persistent storage, a snapshot of the set of configuration data. The second example embodiment may also involve exporting, from the persistent storage, a version of the set of configuration data as marked by the snapshot.

A third example embodiment may involve storing, in a single table, a representation of a set of configuration data that is arranged as nodes in a tree, wherein each row of the single table represents one of the nodes. The third example embodiment may further involve writing, to a particular row of the single table, a unique identifier for a particular node. The third example embodiment may further involve writing, to the particular row of the single table, a value of the particular node. The third example embodiment may further involve writing, to the particular row of the single table, a specification of a path from a root node of the nodes to the particular node, wherein the path shares a common prefix with a parent node of the particular node and any sibling nodes of the particular node. The third example embodiment may further involve writing, to the single table, a further row, wherein the further row also represents the particular node, wherein a first time period specified in the particular row is disjoint from a second time period specified in the further row. The third example embodiment may further involve indicating, in the particular row of the single table, that the particular row has been superseded.

In a fourth example embodiment, an article of manufacture may include a non-transitory computer-readable medium, having stored thereon program instructions that, upon execution by a computing system, cause the computing system to perform operations in accordance with the first, second, and/or third example embodiment.

In a fifth example embodiment, a computing system may include at least one processor, as well as memory and program instructions. The program instructions may be stored in the memory, and upon execution by the at least one processor, cause the computing system to perform operations in accordance with the first, second, and/or third example embodiment.

In a sixth example embodiment, a system may include various means for carrying out each of the operations of the first, second, and/or third example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
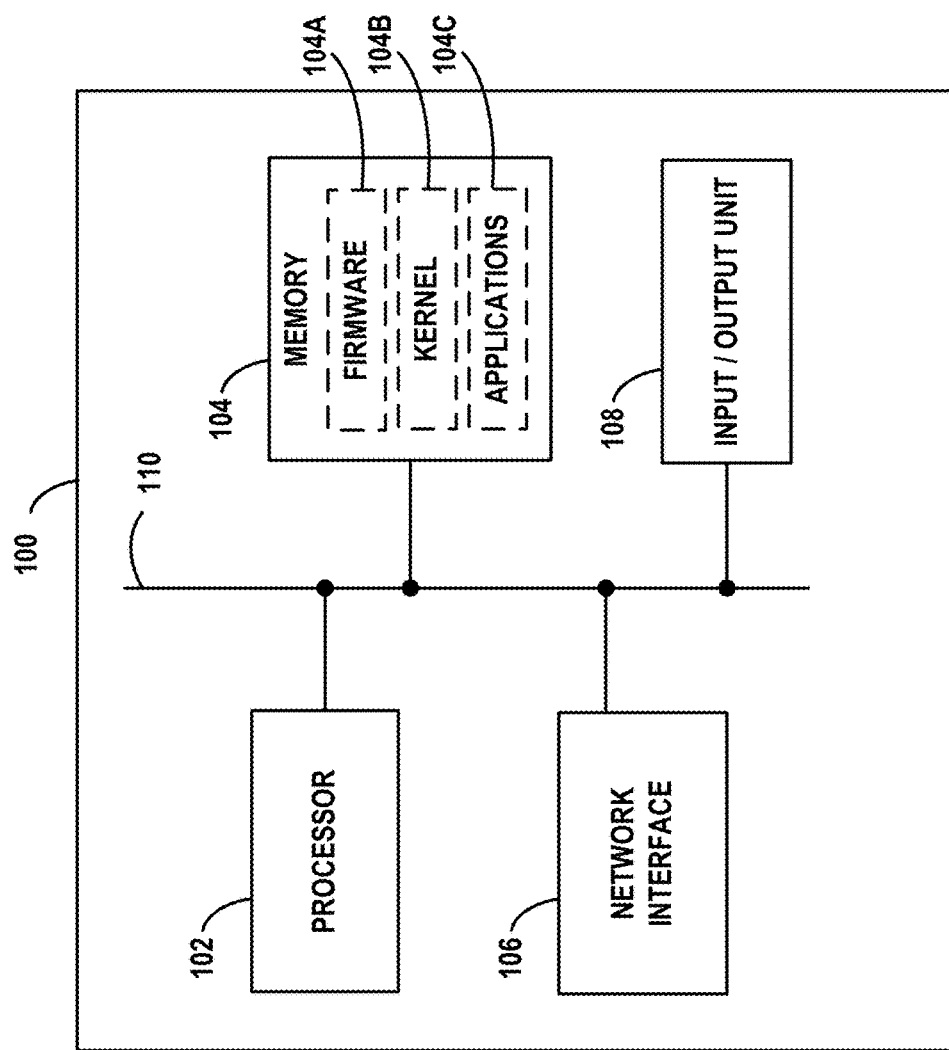
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling, and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
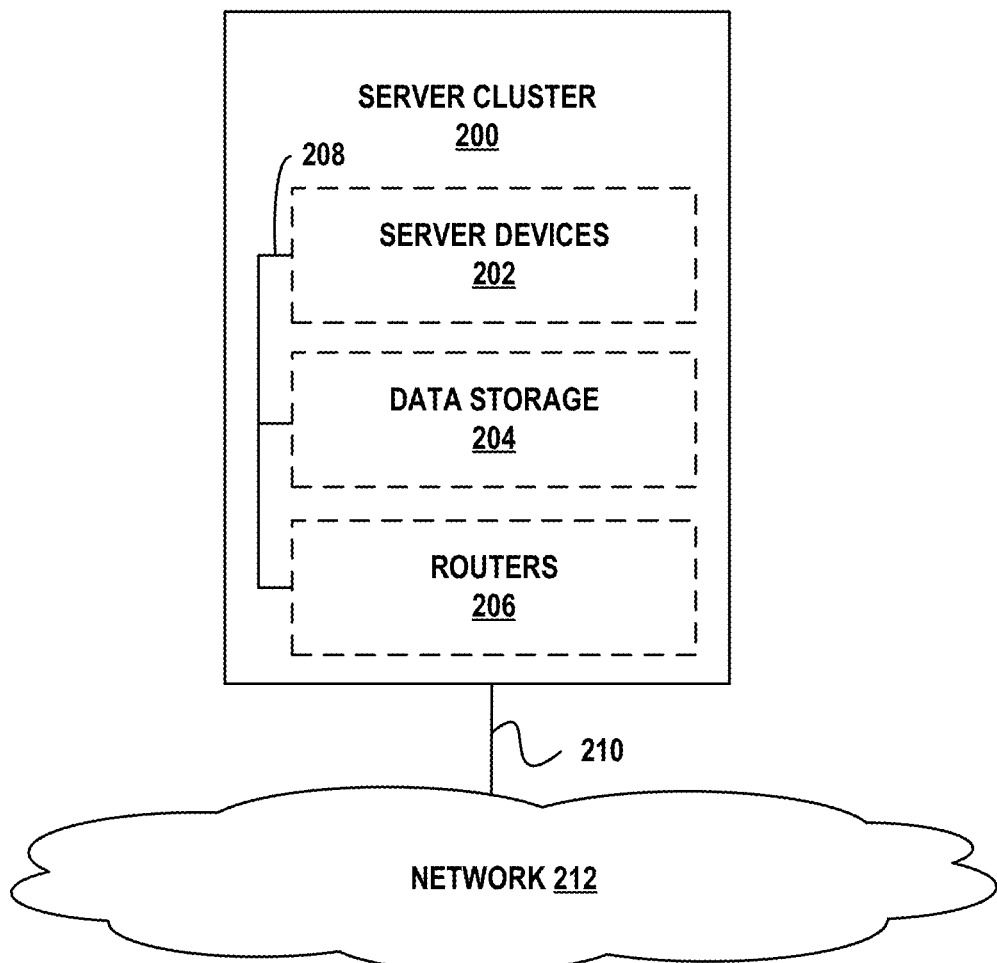
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
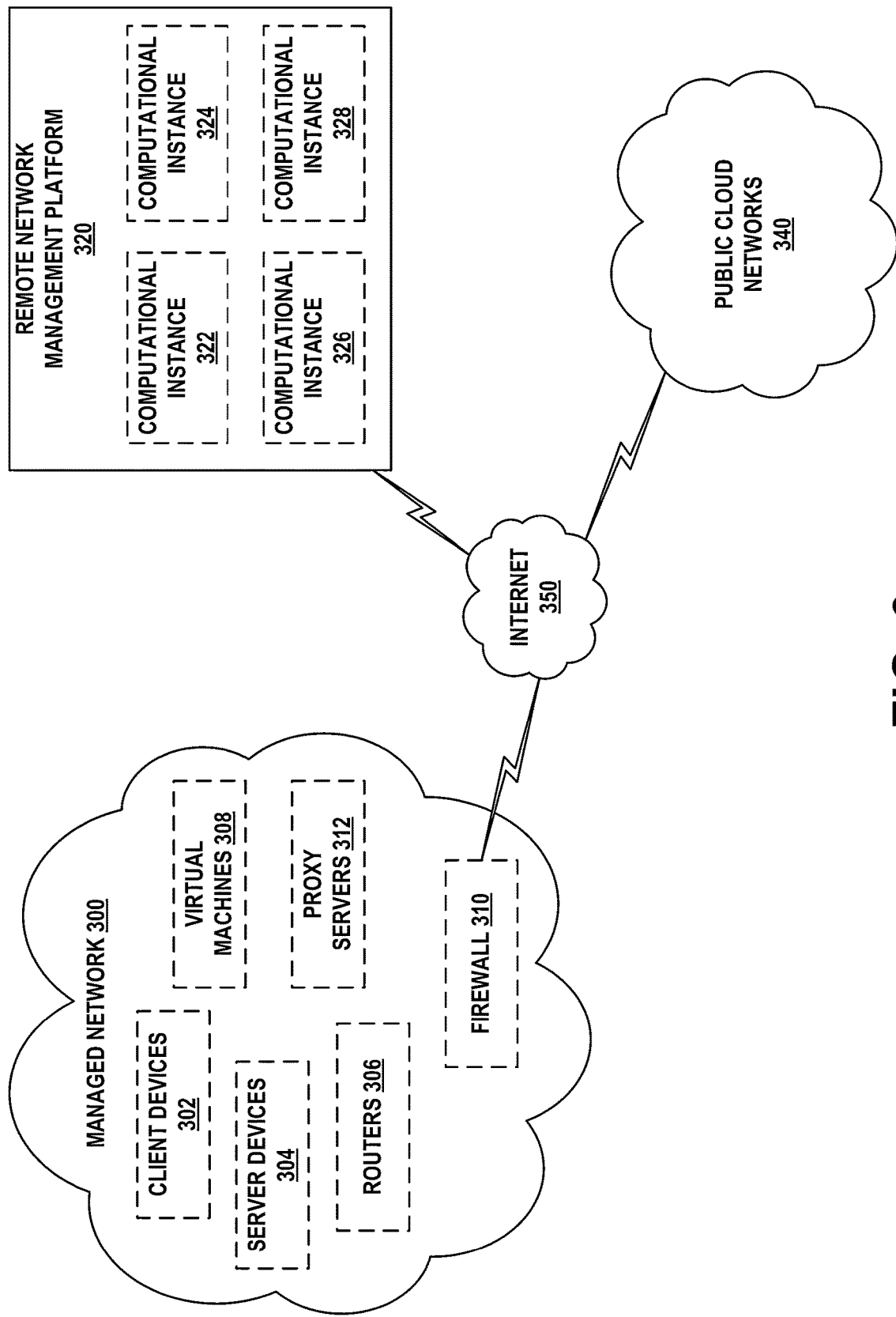
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers.

Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
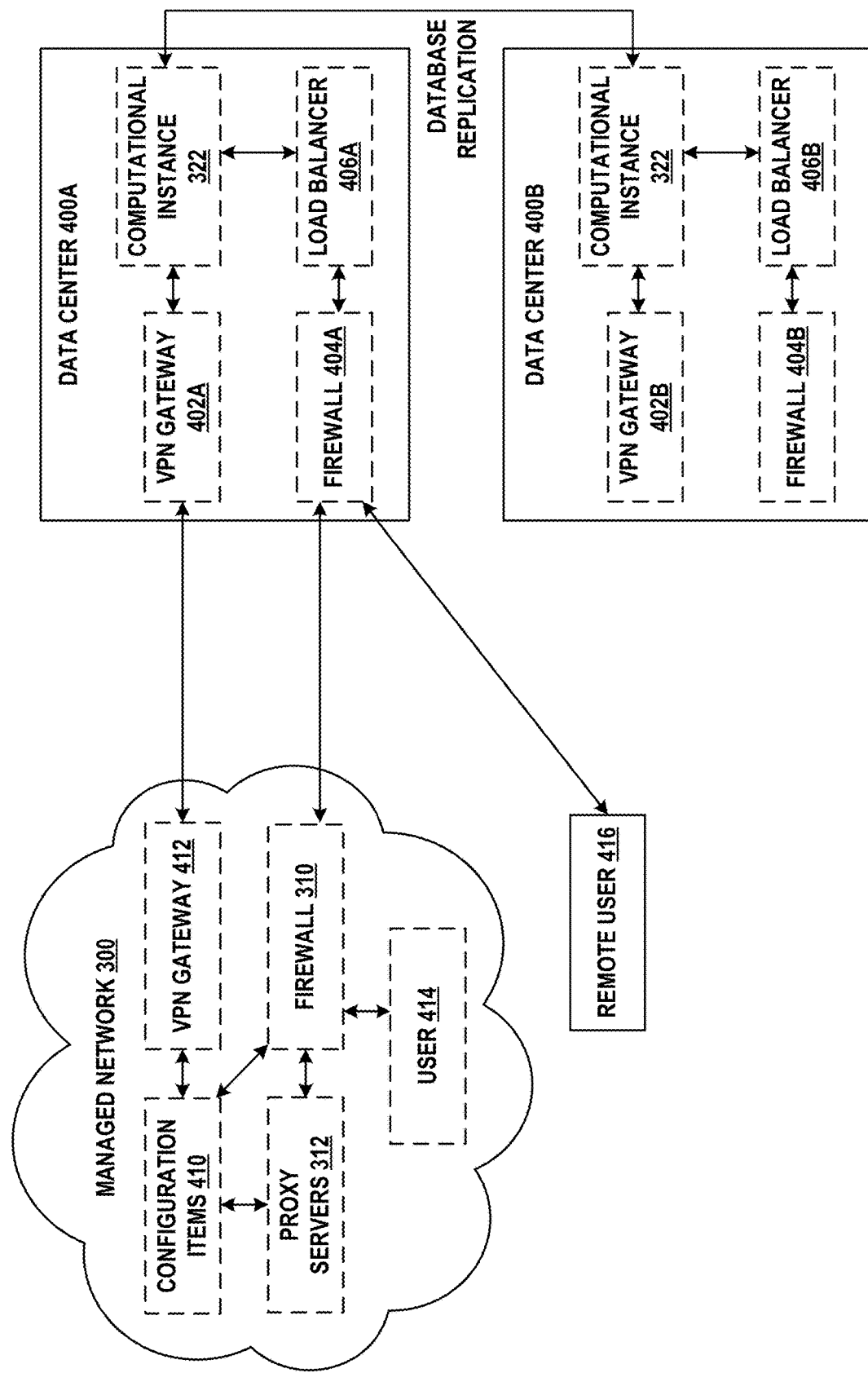
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
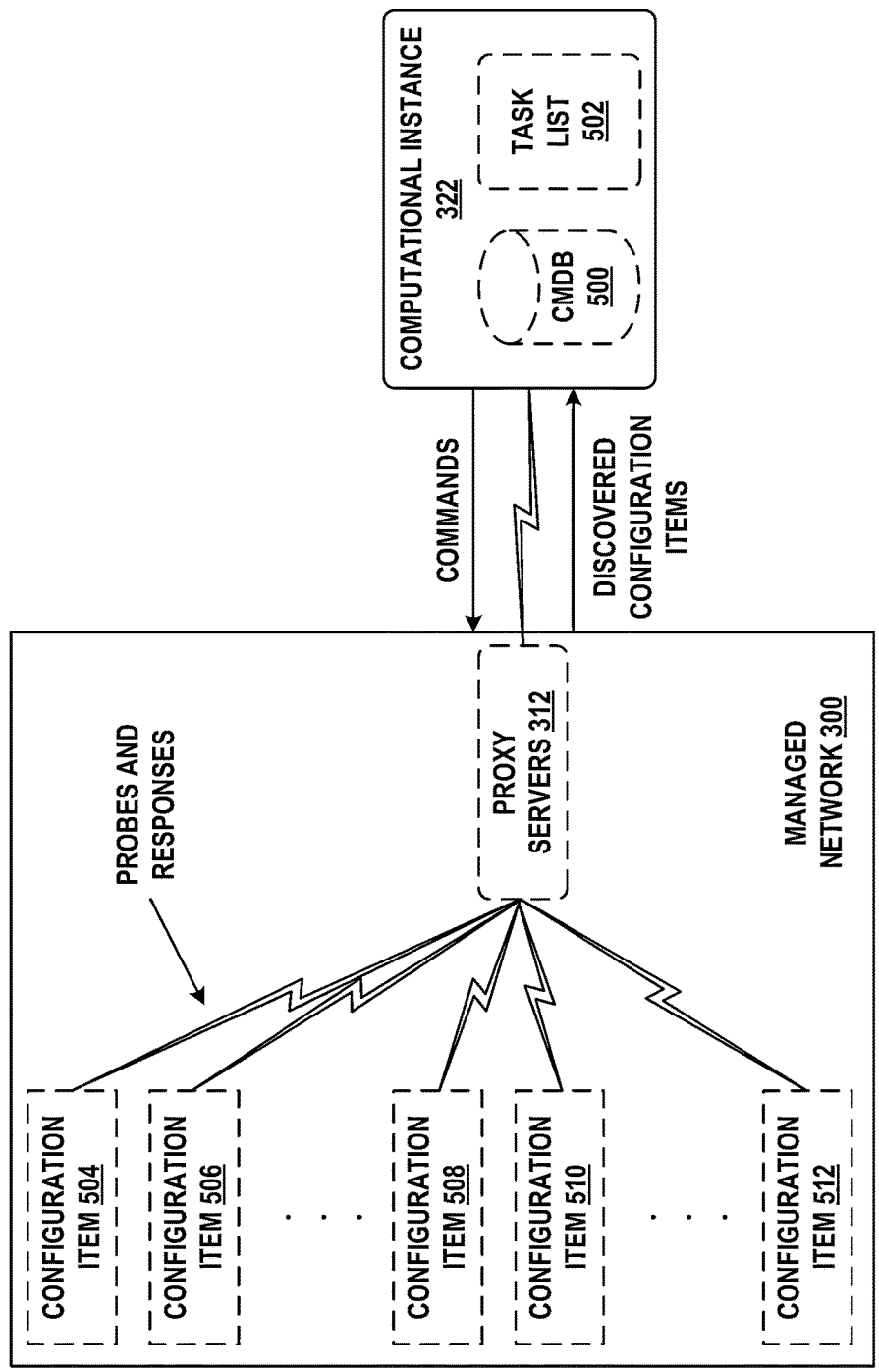
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
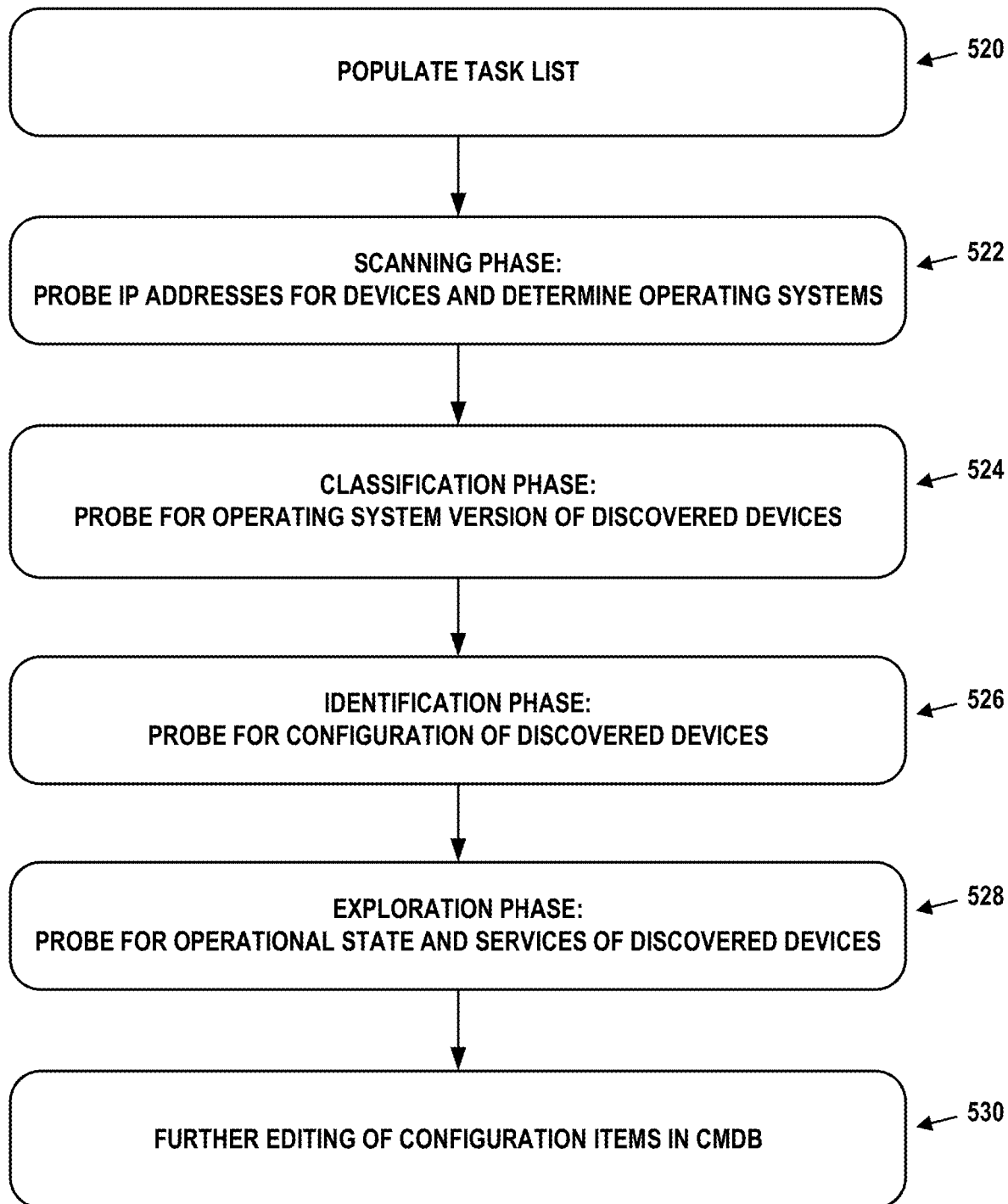
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Configuration Data Management

As noted above, configuration data management refers to groupings of data and policies that specify how certain computing devices, applications, and/or services are expected to operate. For sake of simplicity, these computing devices, applications, and/or services will be referred to as "applications" or "distributed applications" herein.

The term "configuration data" as used herein should not be confused with the term "configuration item" used in referenced to a CMDB. Configuration data is data that drives the configuration of devices, applications, and services. The same service can behave differently in different environments based on settings specific in the configuration data. Configuration data needs to be correct and accurate or a system or subsystem might not function correctly. Depending on the architecture, configuration data may be external to an application or may be bundled with a specific version of an application for a specific environment.

Configuration data management becomes important in the development, staging and deployment of applications in a network or across networks. For example, software developers may design and create application source code and associated configurations, and save these in code repositories. Build tools may automatically or upon request retrieve a version of the code and its configuration, compile or otherwise arrange the application source code into one or more executable files, validate the executable files with respect to the configuration, and then deploy the executable files and configuration.

Most environments are set up so that development and testing of applications occurs on separate infrastructure from the production use of the applications. Thus for example, software developers may use one part of a network or a particular set of computing devices for development (a development environment), another part of the network or a another set of computing devices for testing (a test environment), and yet another part of the network or yet another set of computing devices for production (a production environment). In some cases, more or fewer environments could be used. For instance, development and test could share the same environment (e.g., in a secure lab), while production could be its own environment (e.g., in a live network capable of servicing requests from users or other entities).

As a rather simple example of configuration data management, an application may be arranged to read a configuration file upon its initialization or from time to time as the application executes. The configuration file may be a text file with content formatted in accordance with XML, JAVASCRIPT® Object Notation (JSON), Yet Another Markup Language (YAML), a flat file, comma-separated values (CSV), or some other layout. The configuration file may specify two IP addresses, the first of a database with which the application can store and retrieve data, the second of an email server to which the application can send messages such that the email server will format the messages into emails and send them to designated recipients.

When used in the development and test environment, the configuration file may use different IP addresses than in the production environment. For example, the development and test IP addresses may be designated as DEV_IP1 and DEV_IP2, respectively, while the production IP addresses may be designated PROD_IP1 and PROD_IP2, respectively. This allows the application to be tested against non-live servers under control of the software developers, and mitigates the risk of development and testing procedures causing disruptions or data loss on the live servers.

Put another way, the software developers may maintain test database and email servers in their lab (i.e., with IP addresses DEV_IP1 and DEV_IP2 respectively). These servers may be disconnected from or firewalled off from the production environment, but in some cases the environments may be communicatively linked in some fashion. In either case, the software developers can configure the test servers as needed or desired, reboot these servers, and experiment with these servers without impacting the production environment or its services. However, once the application or a new version thereof is ready for deployment into the production environment, a different configuration file specifying IP addresses PROD_IP1 and PROD_IP2 should be deployed with the application.

This simple example provides two ways in which deployment of configuration data could fail. First, if the IP addresses PROD_IP1 and PROD_IP2 are used accidentally in the development and test environment, then it is possible for the production database referenced by PROD_IP1 to be corrupted by development and testing procedures. Likewise, it is possible that the email server referenced by PROD_IP2 would be triggered to send emails to actual users in response to these development and testing procedures. Another way in which such a deployment of configuration data could fail is if the IP addresses DEV_IP1 and DEV_IP2 are used accidentally in the production environment. These IP addresses might not be reachable in the production environment, or might be used by devices that are not operating the production database and email server. As a result, any service provided by the application may fail to operate correctly or at all.

Therefore, it should be clear that even for a relatively modest application, human error can easily lead to misconfigurations that negatively impact services and users attempting to access these services. More complex services involving half a dozen or more nodes or microservices that are used as components for distributed applications are even easier to misconfigure due to their inherent complexity.

The data configuration management embodiments provided herein include methods, devices, systems, and techniques that can reduce the likelihood of such errors (and possibly other types of errors as well) by defining and deploying proper configuration data, and in some cases, preventing the deployment of improper configuration data. Doing so involves a number of software features implemented, for instance, on a computational instance of a remote network management platform, use of CMDB data gathered through discovery processes, and/or an optional single-table database configuration representation that is both hierarchical and efficient.

A. Example Procedures

Figure 6:
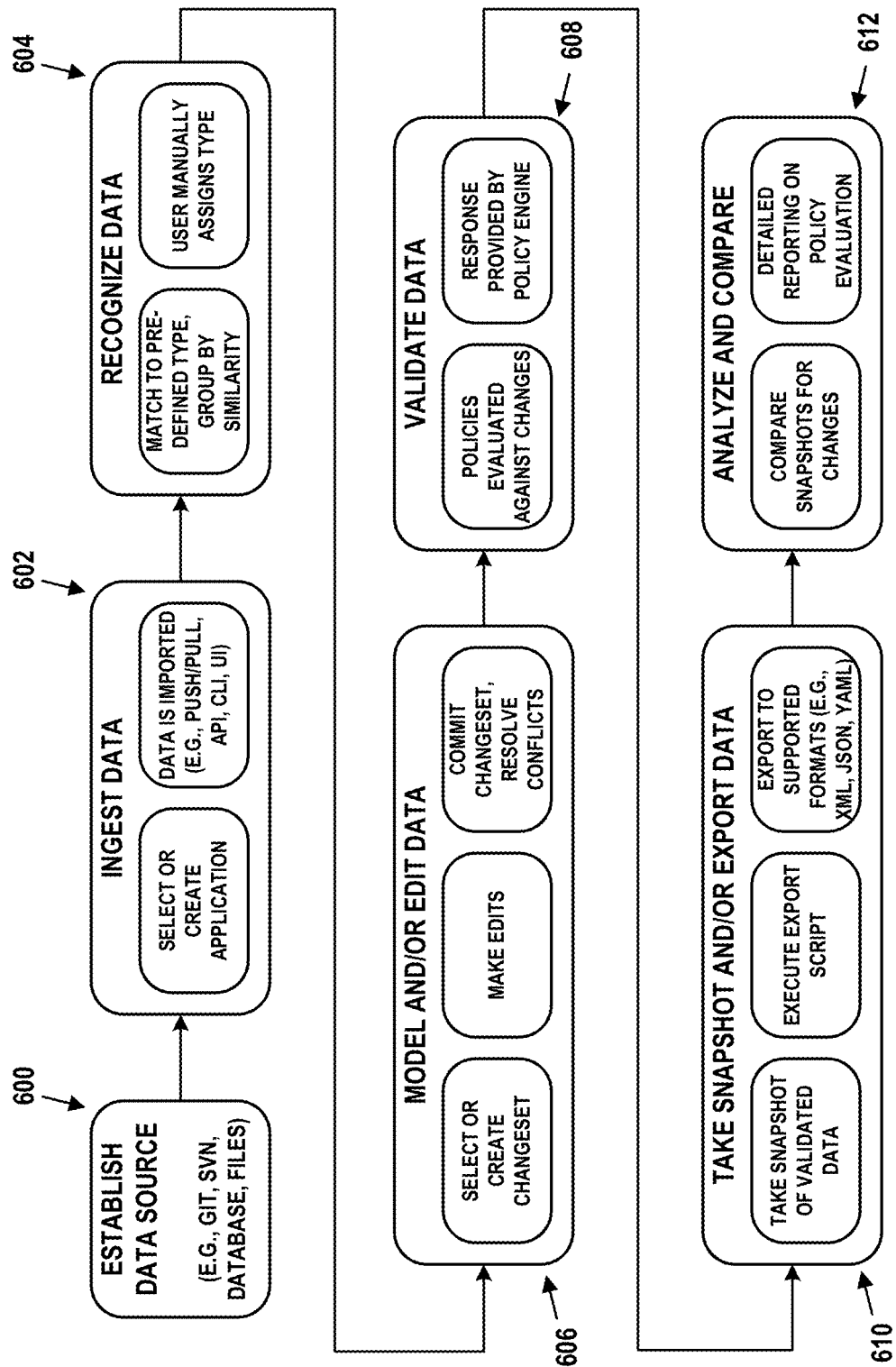
FIG. 6 depicts a procedure for configuration data management, in accordance with example embodiments.

FIG. 6 depicts an example procedure for configuration data management. All steps of this procedure could be carried out on a computational instance (e.g., computational instance 322) with the possible exception of step 600. Thus, these steps may be mediated by way of one or more web interfaces generated by a configuration data management application operating on such a computational instance. A human user may be able to interact with these web interfaces in at some of the steps. Alternatively, some or all of these steps may be automated.

Step 600 involve establishing, identifying, or otherwise using a data source. The data source may be any computer location that stores or has access to configuration data, such as a source code control system (e.g., git, subversion (svn), etc.), build, test, and/or deployment tools (e.g., make, Terraform, Ansible, Jenkins, Maven, Ant, etc.), one or more databases, or one or more configuration files. Other types of data sources may exist, including configuration tools, such as Chef or Puppet). Also, more than one data source may be used. The data source may be disposed upon a managed network (e.g., managed network 300) as part of a development, test, and/or build environment. But in some cases, the data source could reside in a public cloud network (e.g., one of public cloud networks 340).

Step 602 may involve ingesting data from the data source. For example, the user may select, by way of a web interface, a pre-existing specification of an application associated with the data. This pre-existing specification may be arranged to obtain data from the data source. Alternatively, the user may choose to create, by way of the web interface, a new specification of an application associated with the data. Then, this new specification may be arranged to obtain data from the data source. Obtaining the data may involve the computational instance pulling the data from the data source (e.g., by way of a discovery-like process), the data source pushing the data to the computational instance (e.g., by way of a representational state transfer (REST) application programming interface (API) or file transfer protocol (FTP) service), by way of other APIs, by way of a command line interface (CLI), or by way of user interface upload, for example. Ingested data may be stored in a database supported by or accessible to the computational instance.

Step 604 involves the computational instance recognizing the data. This recognition could be based on rules (e.g., simple or compound algebraic and/or Boolean rules provided by a human expert), based on artificial intelligence/machine learning (AI/ML), based on human classification, or based on some combination thereof. For example, rules or AI/ML processing may match elements of the data to pre-defined types and/or group these elements through use of a similarity metric. Alternatively or additionally, a human user could manually assign the types. Notably, step 604 may involve the computational instance making use of centralized services within a remote network management platform for AI/ML processing in order to offload processor and memory utilization associated with such tasks. In some cases, the rules could be codified in executable scripts.

Step 606 may involve modeling and/or editing the data. This may involve selecting or creating a changeset related to the data. A changeset is a group of one or more changes that have been made to various parts of the data, or are planned to be made to the data, and that can be tracked, committed together, and audited. These may include changes made between two successive versions of the data to be incorporated into a formal or informal release, or the changes made to the data that facilitate release of a specific feature. Other changeset definitions may be possible. Edits may be made to these changesets, either automatically (e.g., by the configuration data management application in accordance with pre-defined functions) or manually (by a human user). Once these edits are made to satisfaction, they may be committed. This may involve saving the edits to the database that stores the data. Saved edits can be stored and then later retrieved for purposes of audit and comparison with other configuration data.

Step 608 may involve validating the data. This may include applying one or more pre-defined policies to elements of the data, especially focusing on the data in the changesets. For example, the computational instance may support a policy engine that is arranged to perform simple validation (e.g., that a numeric element is indeed numeric or that an IP address element is properly specified and formatted) or more complex validation (e.g., that a group of elements takes on a combination of values that are permitted). More detail about policies and evaluations thereof is provided below. Any elements that fail one or more validations may be flagged (e.g., on the web interface) and the user may be prompted to continue editing until validation succeeds. In some cases, the validations may take place by way of the execution of one or more custom scripts.

Step 610 may involve taking a snapshot of the data and/or exporting the data. A snapshot is a copy or reference to a particular set of validated data and/or changes thereto that are otherwise ready for use with deployments. The benefits of having snapshots available is that they often represent configurations that were deployed or are planned for deployment, and thus it may be known whether any resulting deployments were successful or exhibited failures. These snapshots can be compared to one another in order to narrow down or determine possible failure causes. In any event, this step may also involve exporting one or more snapshots by way of scripts executable on the computational instance. These scripts may export the snapshot data into various forms, such as XML, JSON, YAML, a flat file, or CSV. Configuration data in such formats may be directly usable by source code repositories or build tools, or can be processed so that they are usable by these entities. The format of the exported data may match the requirements of the target system to which the exported data will be provided.

Step 612 may involve analyzing and comparing the snapshots. As noted above, the differences between snapshots can be used to determine differences between the configuration data used in various deployments, and in some cases can be helpful in detecting failures in deployments. Further, reports of the policy evaluations on these snapshots can be made.

The steps of FIG. 6 are provided for purposes of illustration and example. More or fewer steps may be used, and steps can be performed in different orders.

The configuration data management application may be used to ingest data, model the data, and control what is going to be deployed in each environment. As noted above and in more detail below, the stored configuration data may be used by development operations (devops) applications executing on the computational instance for these purposes. But there are further advantages to having configuration management data centralized on a computational instance. For example, IT operations management (ITOM) and/or IT service management (ITSM) applications executing on the computational instance may be able to determine changes in the configuration data over time, as well as whether and how these changes might impact other services or operations. Doing so allows the entity operating the managed network to proactively address these changes and their impacts. Further, governance, risk, and compliance (GRC) applications executing on the computational instance may be able to determine whether any of these changes are out of compliance.

B. Example Software Architecture

Figure 7:
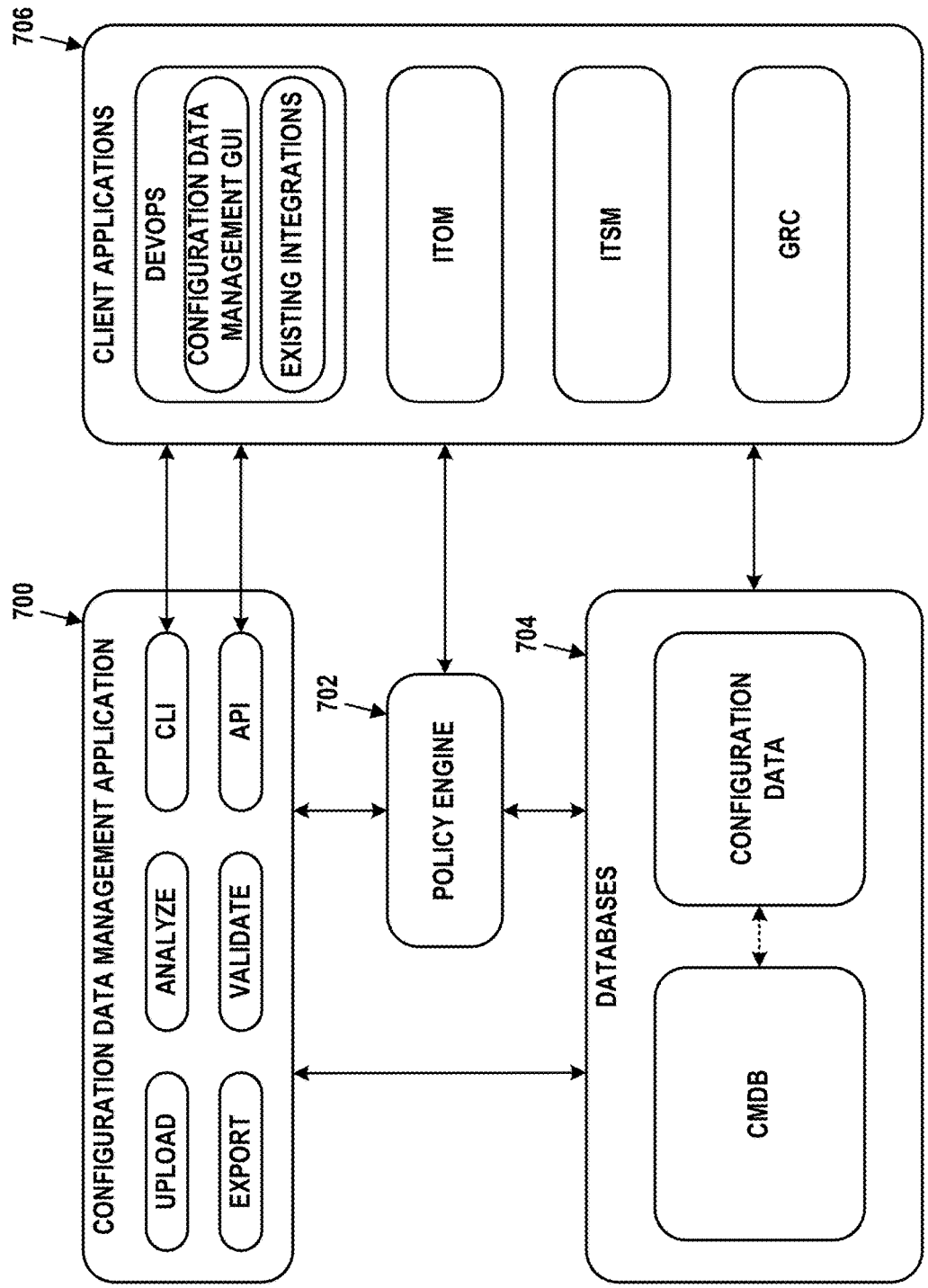
FIG. 7 depicts an architecture for configuration data management, in accordance with example embodiments.

FIG. 7 provides an example software architecture for certain embodiments. Configuration data management application 700 may include modules that can be used to upload (ingest data), export (e.g., outputting of a snapshot), analyze (recognize, model, and/or edit), and validate configuration data. Configuration data management application 700 may also be able to communicate with other applications by way of one or more CLIs and/or APIs.

Policy engine 702 may be a logically separate and distinct software module, or it might be integrated with configuration data management application 700. As noted, policy engine 702 may perform validation on single elements of the configuration data or on groupings of these elements.

Databases 704 may include a CMDB (e.g., CMDB 500), and a configuration data database. Both may be accessed by way of one or more APIs (not shown). Configuration data management application 700 may access the configuration data database when uploading or exporting configuration data, for example. Policy engine 702 may access the CMDB and/or the configuration data database when executing policies. Other applications may also be able to access databases 704 (i.e., multiple client applications may be able to read from and write to the CMDB, and some may be able to read from the configuration data database). In some cases, a client application may be permitted to write to the configuration data database as well.

Client applications 706 provide examples of applications, possibly operating on the same computational instance as configuration data management application 700, that can interact with configuration data management application 700 as well as databases 704. For example, a devops application is shown, containing a configuration data management GUI module and one or more further modules representing existing configurations. Other applications include ITOM, ISTM, and GRC. Any of client applications 706 may interact with policy engine 702 as well.

From a user's perspective, they may log on to the devops application and interact with configuration data by way of the configuration data management GUI. The devops application then interfaces with configuration data management application 700, policy engine 702, and databases 704 as needed to facilitate at least some of the operations described herein. Alternatively or additionally, configuration data management application 700 may provide its own GUI through which the configuration data can be viewed and edited, and the devops application may access this data by way of databases 704.

C. Example Data

Figure 8:
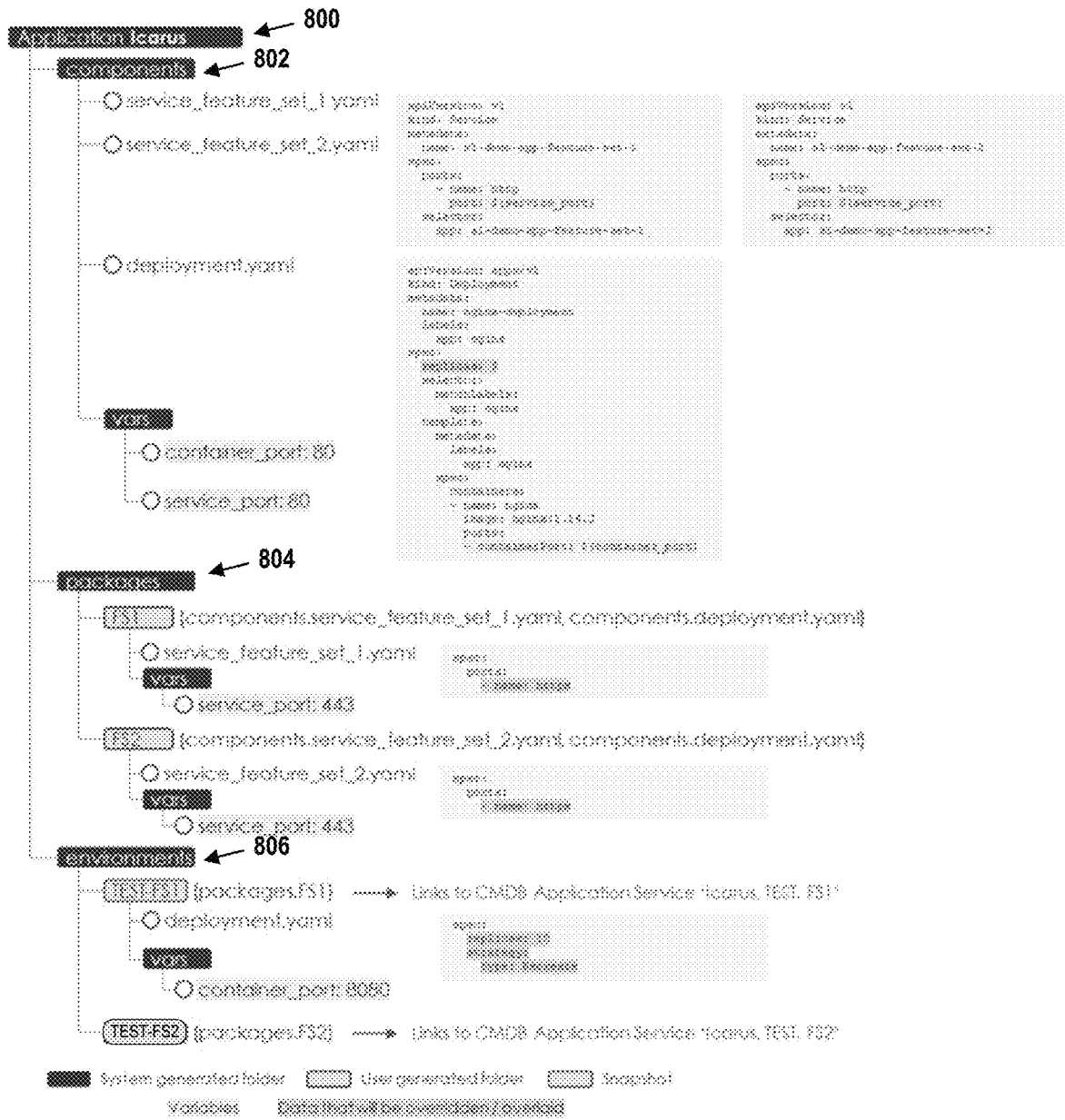
FIG. 8 depicts configuration data, in accordance with example embodiments.

FIG. 8 depicts an example set of configuration data for deployment of application 800 (titled "Icarus"). The configuration data is shown in a tree-like format consisting components 802, packages 804, and environments 806. This particular arrangement is just one example of configuration data can be organized, and other examples are possible.

Components 802 includes configuration files service_feature_set_1.yaml, service_feature_set_2.yaml, and deployment.yaml. The service_feature_set_1.yaml file defines an HTTP service using a port that is specified as a variable (service_port). The service_feature_set_2.yaml defines an HTTP service in a similar fashion. The deployment.yaml file defines a deployment of three replicas of the nginx web server. Components 802 also includes two local variables (vars), one for container_port being assigned a value of 80 and another for service_port also being assigned a value of 80. The service_port variable is used to provide a value to the HTTP service specified in the files service_feature_set_1.yaml and service_feature_set_2.yaml.

Packages 804 includes two packages, FS1 and FS2. FS1 is the combination of configuration files service_feature_set_1.yaml and deployment.yaml from components 802, along with the local configuration file service_feature_set_1.yaml. The content of the local version of service_feature_set_1.yaml can be used to override the content of the version of that file defined in components 802. Particularly, name of the service has changed from http to https. Further, a local variable in FS1 also overrides the service_port variable in components 802 to be 443. This overrides the value of 80 that was used for the service_port variable in components 802. FS2 provides similar definitions for the combination of configuration files service_feature_set_2.yaml and deployment.yaml from components 802. Particularly, FS2 similarly overrides the version of service_feature_set_2.yaml from components 802 with a local file of the same name, and uses a local variable to define the service_port to be 443.

Environments 806 include TEST-FS1 and TEST-FS2. Only TEST-FS1 is shown in its entirety for purposes of simplicity. Particularly, TEST-FS1 is the combination of FS1 from packages 804 and the local file deployment.yaml. The content of this file overrides the version of the file from components 802. Notably, it increases the number of replicas from 3 to 10 and specifies a strategy of "recreate", whereas no strategy was specified in the version of the file from components 802.

Notably, FIG. 8 depicts a useful arrangement of configuration data that allows flexible collections of components into packages, and then packages into deployments. Packages can be given local information (e.g., files or variables) that overrides information in components, while environments can be given local information (e.g., files or variables) that overrides information in components and/or packages.

This incorporation of components into packages and packages into deployments may occur in an object-oriented fashion. Packages can inherit the properties of their incorporated components, but have the ability to override any of these properties. Likewise, deployments can inherit the properties of their incorporated packages, but have the ability to override any of these properties. Nonetheless, other arrangements of configuration data are possible.

D. Example Ingestion

As noted in step 602 of FIG. 6, data ingestion may happen in a number of ways including through use of an API, CLI, GUI, and so on. In some cases, ingestion is manual (human initiated) and in other cases it is automated. Regardless of how ingestion occurs, it may involve asynchronous processing of the ingested configuration data. This has the technical benefit of freeing any mutex lock on the API used for ingestion, so that the API can be used for other activities while the ingested data is being parsed, validated, and persisted to storage.

Figure 9:
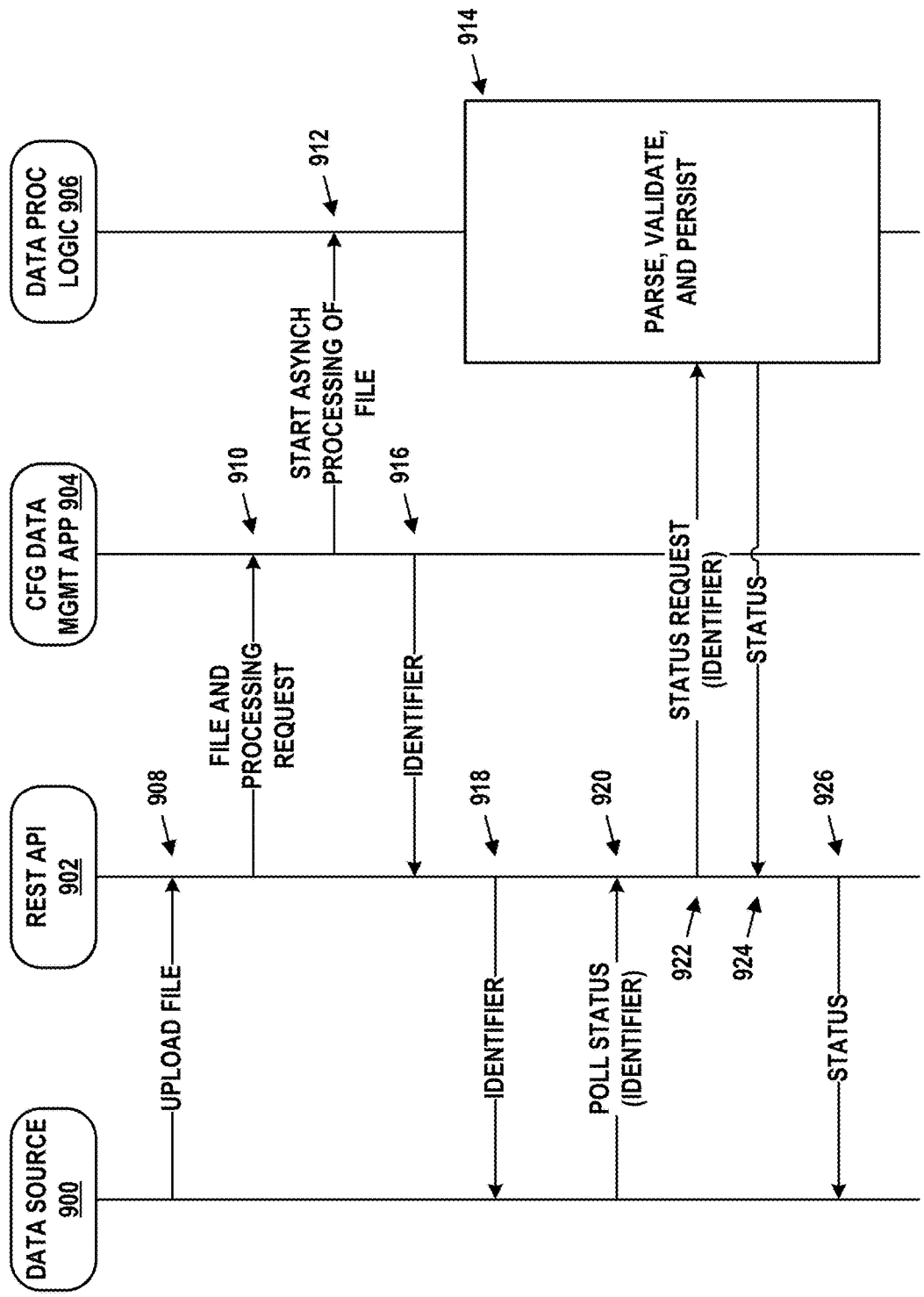
FIG. 9 is a message flow diagram depicting ingestion of a file, in accordance with example embodiments.

FIG. 9 provides a message flow diagram depicting an example of asynchronous ingestion. FIG. 9 involves data source 900 (e.g., a code repository, a database, a filesystem, etc.), REST API 902, configuration data management application 904, and data processing logic 906. In some embodiments, REST API 902 and data processing logic 906 may be part of configuration data management application 904. For purposes of simplicity, FIG. 9 addresses the ingestion of a single file. But in full generality, configuration data may reside in multiple files, database tables, or other structures.

At step 908, a file is uploaded from data source 900 to REST API 902. At step 910, REST API 902 generates a processing request for the file and then transmits the file and the processing request to configuration data management application 904.

At step 912, configuration data management application 904 may transmit the file and command to data processing logic 906 to begin asynchronous processing of the file. At step 914, data processing logic 906 may perform this asynchronous processing, which may include parsing, validating, and persisting configuration data within the file.

At step 916, in response to beginning the asynchronous processing, configuration data management application 904 may provide an identifier to REST API 902. This identifier may uniquely specify the asynchronous processing of this particular file. At step 918, REST API 902 may provide the identifier to data source 900.

At this point, the asynchronous processing may continue until it is complete, while REST API 902 is free to perform other activities, including the ingestion of more files. Nonetheless, data source 900 (or another entity with access to the identifier) may use the identifier to poll REST API 902 about the status of the asynchronous processing. This is illustrated in steps 920, 922, 924, and 926, which are optional.

At step 920, data source 900 may poll REST API 902 for the status of the asynchronous processing. This polling may take the form of a poll status message that includes the identifier. At step 922, in response, REST API 902 may send a status request containing the identifier to data processing logic 906. In some embodiments, this status request may flow through configuration data management application 904. In either case, data processing logic 906 may receive the status request and use the identifier to look up the status of the associated asynchronous processing job. At step 924, data processing logic 906 may respond to REST API 902 with the status. The status may indicate, for example, that the asynchronous processing is still underway, has completed successfully, or has been terminated due to an error. At step 926, REST API 902 provides the status to data source 900 or any other requesting entity.

E. Example Policy Engine

Figure 10:
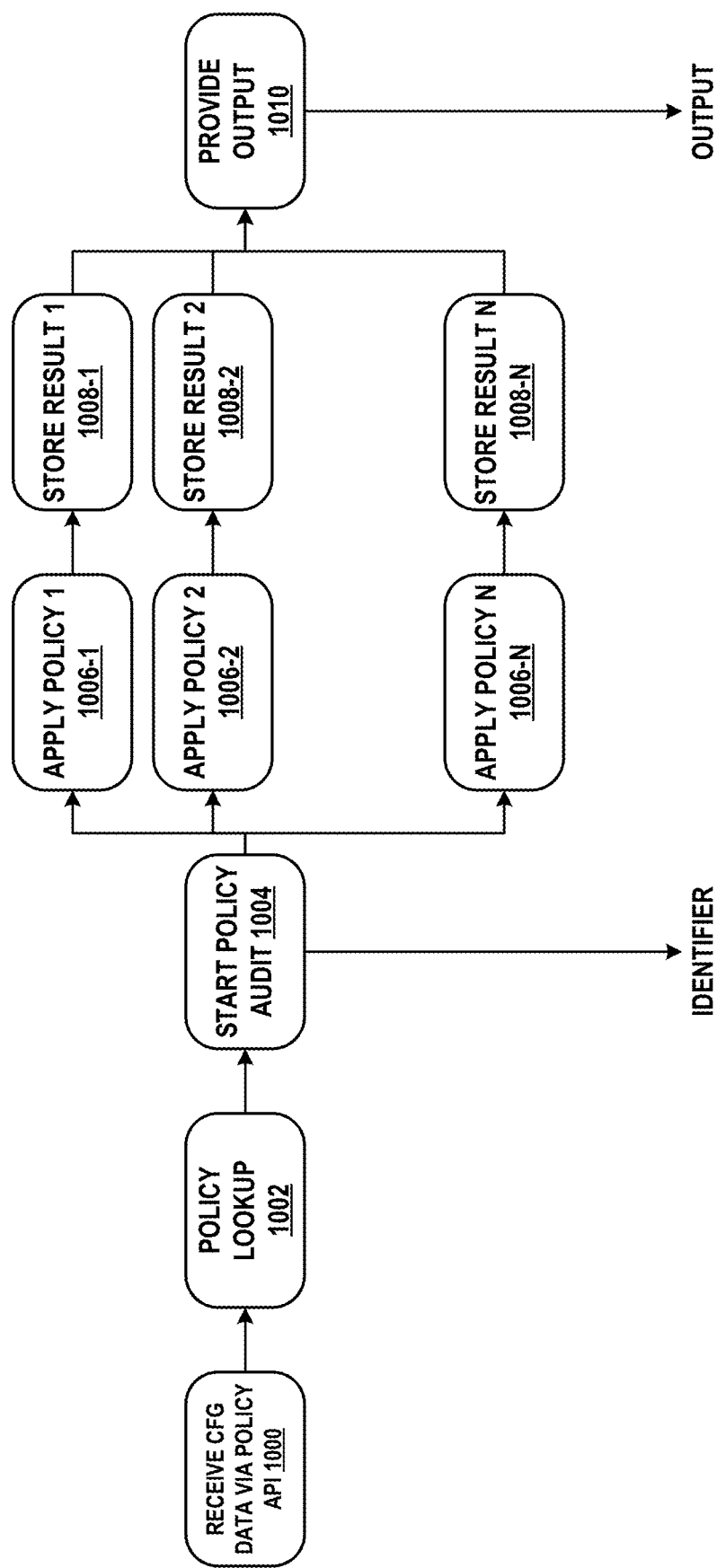
FIG. 10 depicts a procedure for applying policies to configuration data, in accordance with example embodiments.

FIG. 10 depicts an example policy engine and operations thereof. The components and/or functionality of FIG. 10 may exist within an implementation of policy engine 702 for example.

At step 1000, configuration data is received by way of a policy API. Such an API could be a REST API, inter-process communication API, or some other form of interface that allows configuration data to be imported into the policy engine. Along with configuration data, certain other metadata may be included, such as one or more relevant configuration items, groups of configuration items, groups of users, specifications of specific policies to apply, and/or other information.

At step 1002, some or all of this information may be used to look up one or more policies to apply. For instance, the configuration data and/or metadata may be parsed to determine these policies.

At step 1004, the policy audit may be started. This could involve launching one or more policy executions in parallel, or carrying out the policy executions serially. In some embodiments, application of the policies is associated with an identifier that uniquely identifies the execution of the identified policies. As discussed in the context of FIG. 9, this identifier can be used to poll or otherwise query the status of the application of the policies.

At steps 1006-1, 1006-2, ..., 1006-N, a total of N policies are applied to the configuration data. In some cases, different subsets of the configuration data may be considered by each of these N policies.

As noted, these policies may validate individual elements of the configuration data or groupings of these elements. For example, an element that is defined to represent an IP addresses could be checked to make sure that it contains a properly formatted IP address. Likewise a service that is defined to use secure HTTP may have its elements checked to ensure that TCP port 443 is used. Similarly, an element that is defined to store a password may be checked to make sure that the password is of the appropriate strength (e.g., at least 12 characters consisting of uppercase letters, lowercase letters, numbers, and special characters).

Even if individual elements are validated in isolation, certain combinations of values for these elements may be invalid. For example, a service with a name of "http" is typically used with one of TCP ports 80 or 8080. Thus, a policy may enforce such a combination. Likewise, certain software packages may be deployable only on to certain types of computing devices. For example, an application compiled for WINDOWS® should only be deployed to a computing device configured to execute the WINDOWS® operating system. Therefore, a policy may also check to ensure that the compilation target operating system matches the deployment operating system.

Furthermore, data from the CMDB or other parts of database 700 may be read in order to carry out certain validations. As one possible example, if an IP address appears in the configuration data, the CMDB may be checked to ensure that this IP address is assigned to a computing device. If the IP address cannot be found in the CMDB, the configuration data may be flagged as invalid. Further, if the IP address appears in the CMDB but has a latest discovery date that is more than a certain amount of time in the past (e.g., one month), then the CMDB data may be stale. In this case, the validation may fail with a warning to double check that the CMDB data is accurate.

At steps 1008-1, 1008-2, . . . , 1008-N, the respective results of applying the policies at steps 1006-1, 1006-2, . . . , 1006-N to the configuration data are stored. For instance, these results may be stored to databases 700.

At step 1010, output regarding the application of the policies is provided. The output may be a combination of the results stored at steps 1008-1, 1008-2, . . . , 1008-N. For example, the output may be a summary or assessment of these results. In one possible embodiment, the output indicates whether application of any of the policies resulted in the configuration data being deemed invalid. If so, the policy applications that failed and the related reasons for the conclusions of invalidity may be provided. Other possibilities exist.

F. Integration with Build, Test, and Deployment Tools

The operations related to configuration data described herein may be integrated with build, test, and/or deployment tools so that these operations are automatically performed during build, test, and/or deployment procedures. The build, test, and deployment tools include, but are not limited to make, Terraform, Ansible, Jenkins, Maven, and Ant, and may be generally referred to as "devops tools". Many of these tools are extensible by way of plugins and support hooks (e.g., webhooks) that allow to other units of software to be placed within the build, test, and/or deployment procedures. Further, these tools may be able to perform continuous integration and testing, with their operation being triggered by commits to a source code repository.

Figure 11:
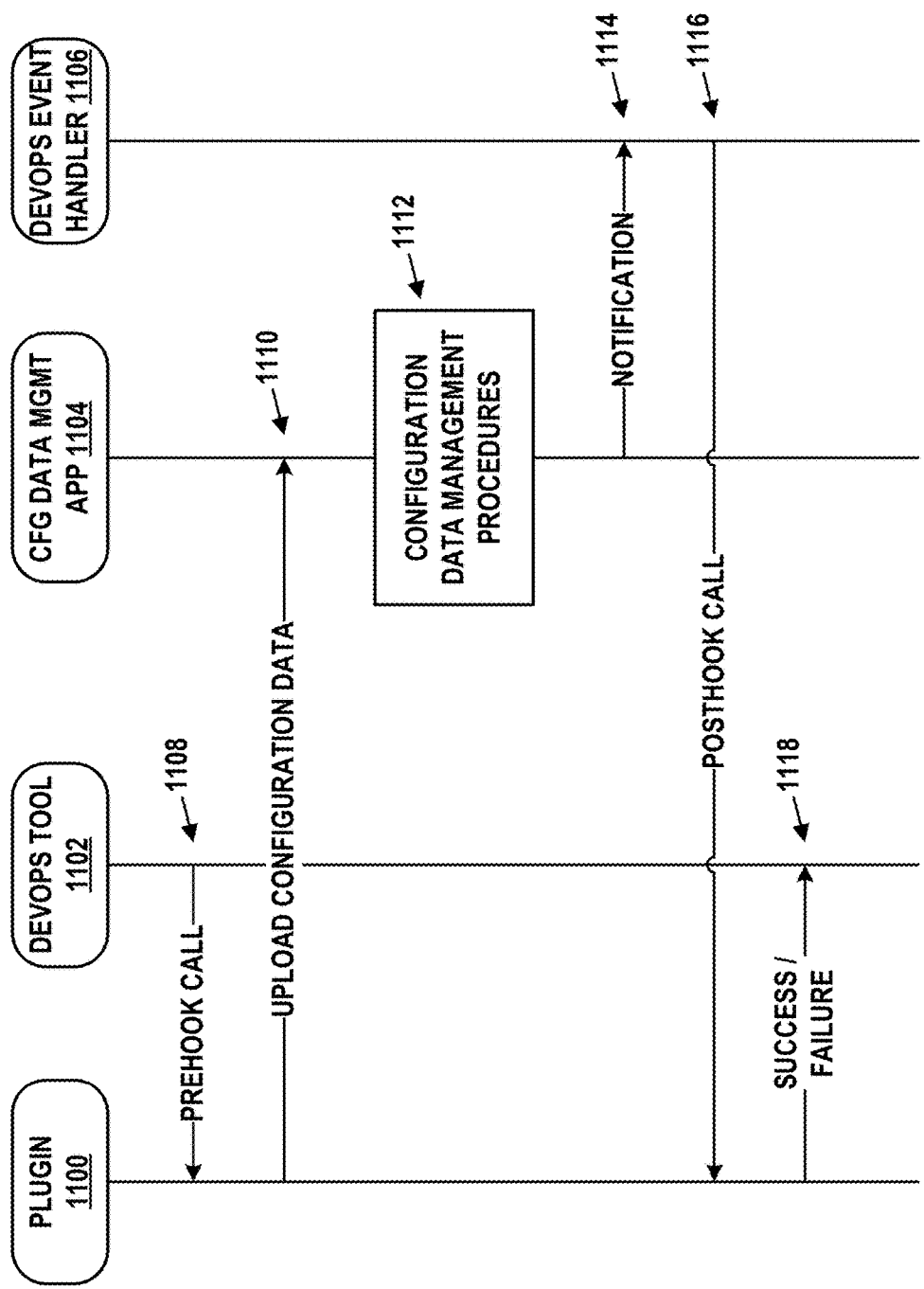
FIG. 11 is a message flow diagram depicting integration of configuration data management procedures with a development operations tool, in accordance with example embodiments.

FIG. 11 is a message flow diagram depicting operation of a devops tool with a hook that can be used to trigger configuration data management procedures. In FIG. 11, plugin 1100 is custom logic accessible to devops tool 1102. Configuration data management application 1104 may operate as described herein (e.g., taking on any of the functionality of configuration data management applications 700 and/or 904, as well as policy engine 702 and/or data processing logic 906). Devops event handler 1106 may be a separate application that routes certain notifications from configuration data management application 1104 to plugin 1100. Alternatively, the functionality of devops event handler 1106 could be integrated into configuration data management application 1104.

In some embodiments, plugin 1100 and devops tool 1102 may be disposed with a managed network (e.g., managed network 300) while configuration data management application 1104 and data processing logic 906 may be disposed within a computational instance of a remote network management platform (e.g., computational instance 322). But other possibilities exist.

At step 1108, devops tool 1102 provides a prehook call to plugin 1100. This prehook call may be a function or remote procedure call associated with a hook configured in devops tool 1102. The hook may be arranged to allow configuration data management procedures to be executed during build, test, or deployment operations for a software application.

To that point, step 1110 may involve plugin 1100 uploading configuration data from a data source (e.g., git or svn) to configuration data management application 1104. Plugin 1100 may receive, from devops tool 1102, an indication of the configuration data to upload, locate this configuration data in the data source, and transmit it to configuration data management application 1104.

At step 1112, configuration data management application 1104 may carry out configuration data management procedures. As discussed herein, this may involve ingesting the data, formatting it, applying one or more policies, and determining whether the configuration data is valid based on the outcome or applying these policies.

At step 1114, configuration data management application 1104 may provide a notification of this outcome to devops event handler 1106. For example, the notification may specify whether application of any of the policies resulted in the configuration data being deemed invalid. If so, the policy application that failed and the related reason for the conclusion of invalidity may be provided.

At step 1116, devops event handler 1106 may transmit a representation of the outcome to plugin 1100 in a posthook call. At step 1118, plugin 1100 may provide an indication of the success or failure of the configuration data management procedures to devops tool 1102.

If a failure has occurred, devops tool 1102 may halt progress on any build, test, or deployment of the software application, and provide an appropriate error message. In this manner, errors in the configuration data as well as errors in the software application itself, can be detected prior to deployment to an environment. Doing so can dramatically reduce the number and severity of invalid deployments.

G. Example Database Structure

In order to store configuration data in a fashion that is efficient to search and retrieve, a single-table approach can be used. This aspect is based on the observation that configuration data takes on a tree-like structure (see FIG. 8 and the accompanying discussion above) or can readily be formatted into a tree-like structure. Further, the single-table approach supports versioning so that changes to data values can be recorded in a way that allows previous data values to be saved, and also support roll backs to previous values as needed. While these embodiments assume use of a relational database, other types of databases could be used.

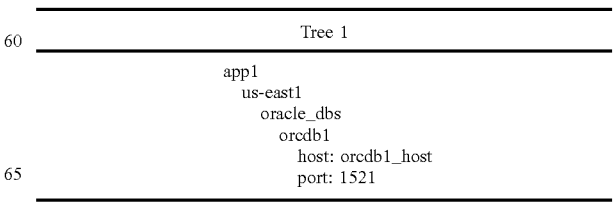

Tree 1 represent an example configuration. In this tree, each node can have an optional value and one or more children. Thus, Tree 1 has a root node "app1" with child node "us-east1". Node "us-east1" has a further child node of "oracle_dbs". Node "oracle_dbs" has yet a further child of node of "orcdb1". Node "orcdb1" has two children, node "host" and node "port". Node "host" has a value of "orcdb1_host" and node "port" has a value of "1521". Thus, node "app1" is at level 0 of the tree, node "us-east1" is at level 1, node "oracle_dbs" is at level 2, node "orcdb1" is at level 3, and nodes "host" and "port" are at level 4. This general structure can be used to represent more complicated trees with any number of children per node and any number of levels.

TABLE 1

| ID | Path | Level | Name | Value | From | To | Status | Changeset |
|----|------|-------|------|-------|------|-----|--------|-----------|
| 1 | / | 0 | app1 | | 1 | Inf | New | 1 |
| 2 | /1 | 1 | us-east1 | | 1 | Inf | New | 1 |
| 3 | /1/2 | 2 | oracle_dbs | | 1 | Inf | New | 1 |
| 4 | /1/2/3 | 3 | orcdb1 | | 1 | Inf | New | 1 |
| 5 | /1/2/3/4 | 4 | host | orcdb1_host | 1 | Inf | New | 1 |
| 6 | /1/2/3/5 | 4 | port | 1521 | 1 | Inf | New | 1 |

Table 1 is in a single-table format that represents Tree 1. Each node in Tree 1 is represented as a row in Table 1. The columns that describe each node include ID (an identifier that is unique to the node within the table), path (representing a traversal of Tree 1 from the root to the node), level of the node, name of the node, and an optional value of the node. The history of changes to the node are recorded using the from and to column (see below). The status column indicates whether the node is new, valid or superseded, and the changeset column indicates the changeset to which this version of the node belongs.

Paths are formatted with labels separated by forward slashes. Each node has a unique label. The root node has a path consisting of a single forward slash, and the number of labels in the path indicate the level of the node. A node's path also represents how one can traverse the tree from the root node at the top of the tree to the node, as well as how one can identify the parent of the node.

Thus, for example, node "us-east1" has a path of /1 (indicating that it is a child of the root node). Likewise, nodes "host" and "port" have paths of /1/2/3/4 and /1/2/3/5 respectively, indicating that they can be reached by traversing the path /1/2/3 from left to right starting at the root node, and that they have a common parent node represented by the path /1/2/3 (node "orcdb1").

Although numerical labels are used in paths for purposes of example, in various embodiments other forms of labels can be used. For example, a base-60 labeling format using all 26 alphabetical characters (case insensitive), all 10 numerical characters, and 24 punctuation and special symbols (e.g., !@#$%^&*( )_-+={ }[ ];:< >/?) results in 4 quadrillion possible labels while remaining within the 255 character limit that most databases impose on string values stored in columns. But symbolic notations with bases less than 60 may be used. For example, any base over 16 could result in a sufficient number of labels being available within the 255 character constraint.

The path structure also allows efficient querying of subtrees because all subtrees involving children of a particular node will have the same path prefix of that node. For example, nodes "host" and "port" both have the prefix /1/2/3 in their paths, which is also a prefix of the path of their parent, node "orcdb1". Thus, a STARTSWITH( ) method in SQL or a higher-level language can be used to find all nodes in a subtree.

| Tree 2 |
|--------|
| app1 |
|   us-east1 |
|     oracle_dbs |
|       orcdb1 |
|         host: orcdb1_host |
|         port: 1521 |
|       orcdb2 |
|         host: orcdb2_host |
|         port: 1522 |

When nodes are added to the tree, these changes can be reflected in the table. For example, Tree 2 specifies three nodes added to Tree 1 as a subtree of node "oracle_dbs". Node "orcdb2" has two children, nodes "host" and "port". These nodes have values of "orcdb2_host" and "1522", respectively.

TABLE 2

| ID | Path | Level | Name | Value | From | To | Status | Changeset |
|----|------|-------|------|-------|------|-----|--------|-----------|
| 1 | / | 0 | app1 | | 1 | Inf | New | 1 |
| 2 | /1 | 1 | us-east1 | | 1 | Inf | New | 1 |
| 3 | /1/2 | 2 | oracle_dbs | | 1 | Inf | New | 1 |
| 4 | /1/2/3 | 3 | orcdb1 | | 1 | Inf | New | 1 |
| 5 | /1/2/3/4 | 4 | host | orcdb1_host | 1 | Inf | New | 1 |
| 6 | /1/2/3/5 | 4 | port | 1521 | 1 | Inf | New | 1 |
| 7 | /1/2/6 | 3 | orcdb2 | | 1 | Inf | New | 1 |
| 8 | /1/2/6/7 | 4 | host | orcdb2_host | 1 | Inf | New | 1 |
| 9 | /1/2/6/8 | 4 | port | 1522 | 1 | Inf | New | 1 |

The single-table representation of this addition is shown in Table 2. Node "orcdb2" has a path of /1/2/6, indicating that node "oracle_dbs" is its parent. Nodes "host" and "port" have paths of /1/2/6/7 and /1/2/6/8, respectively, indicating that they are siblings with node "orcdb2" as their common parent node.

Changesets that are committed (e.g., saved to a source code repository and/or tagged for release in a specific version of application) are also reflected in the single-table structure by updating the status of any nodes impacted by the changeset to "valid". A commit of a changeset from Table 2 is shown in Table 3.

TABLE 3

| ID | Path | Level | Name | Value | From | To | Status | Changeset |
|---|---|---|---|---|---|---|---|---|
| 1 | / | 0 | app1 | | 1 | Inf | Valid | 1 |
| 2 | /1 | 1 | us-east1 | | 1 | Inf | Valid | 1 |
| 3 | /1/2 | 2 | oracle_dbs | | 1 | Inf | Valid | 1 |
| 4 | /1/2/3 | 3 | orcdb1 | | 1 | Inf | Valid | 1 |
| 5 | /1/2/3/4 | 4 | host | orcdb1_host | 1 | Inf | Valid | 1 |
| 6 | /1/2/3/5 | 4 | port | 1521 | 1 | Inf | Valid | 1 |
| 7 | /1/2/6 | 3 | orcdb2 | | 1 | Inf | Valid | 1 |
| 8 | /1/2/6/7 | 4 | host | orcdb2_host | 1 | Inf | Valid | 1 |
| 9 | /1/2/6/8 | 4 | port | 1522 | 1 | Inf | Valid | 1 |

Further, versioning that reflects changes made to a node can be supported by adding a new row for the node while maintaining its previous row or rows with minimal modification. The new row may use the from and to columns to specify a disjoint time period from that of the previous row or rows (with the previous row or rows being updated accordingly). The status column may be updated to indicate that the previous row or rows have been superseded.

Tree 3

```
app1
  us-east1
    oracle_dbs
      orcdb1
        host: orcdb1_host
        port: 1521
      orcdb2
        host: orcdb2_host
        port: 1525
```

As an example, Tree 3 shows the same configuration as Tree 2, but with the port for node "orcdb2" changed to 1525. This change can be reflected in the single-table structure as shown in Table 4.

TABLE 4

| ID | Path | Level | Name | Value | From | To | Status | Changeset |
|---|---|---|---|---|---|---|---|---|
| 1 | / | 0 | app1 | | 1 | Inf | Valid | 1 |
| 2 | /1 | 1 | us-east1 | | 1 | Inf | Valid | 1 |
| 3 | /1/2 | 2 | oracle_dbs | | 1 | Inf | Valid | 1 |
| 4 | /1/2/3 | 3 | orcdb1 | | 1 | Inf | Valid | 1 |
| 5 | /1/2/3/4 | 4 | host | orcdb1_host | 1 | Inf | Valid | 1 |
| 6 | /1/2/3/5 | 4 | port | 1521 | 1 | Inf | Valid | 1 |
| 7 | /1/2/6 | 3 | orcdb2 | | 1 | Inf | Valid | 1 |
| 8 | /1/2/6/7 | 4 | host | orcdb2_host | 1 | Inf | Valid | 1 |
| 9 | /1/2/6/8 | 4 | port | 1522 | 1 | 10 | Superseded | 1 |
| 9 | /1/2/6/8 | 4 | port | 1525 | 11 | Inf | New | 2 |

Particularly, Table 4 shows the previous row for the changed node having a time frame of 1 to 10 in the to and from columns. Further, the status column indicates that this row has been superseded. A new row has been added for the node, having the same ID as the previous row. However, the value has been changed from 1522 to 1525 (reflecting the change between Tree 2 and Tree 3). The time frame for this row is 11 to Inf, which is disjoint from that of the previous row for this node. Further, the status of the new row is new, and it is part of a different changeset.

In this manner, changes to configuration data can be accurately represented in the single table, including a history of all changes. This allows the configuration to be rolled back or rolled forward as needed by taking into account the changes incorporated into each changeset.

In practice, this single-table structure with the paths and recorded changes defined as described results in faster queries and more efficient storage than the traditional technique of maintaining nodes in one table and their relationships in another. Some of this advantage comes from avoiding JOIN operations across multiple tables. Testing has established that queries are approximately 11% faster with a single-table structure and would take up 80% less storage after 2 years if there are 5000 changes per day over this time period. This reduction in storage is largely due to eliminating the relationship table.

VI. Example Operations

Figure 12:
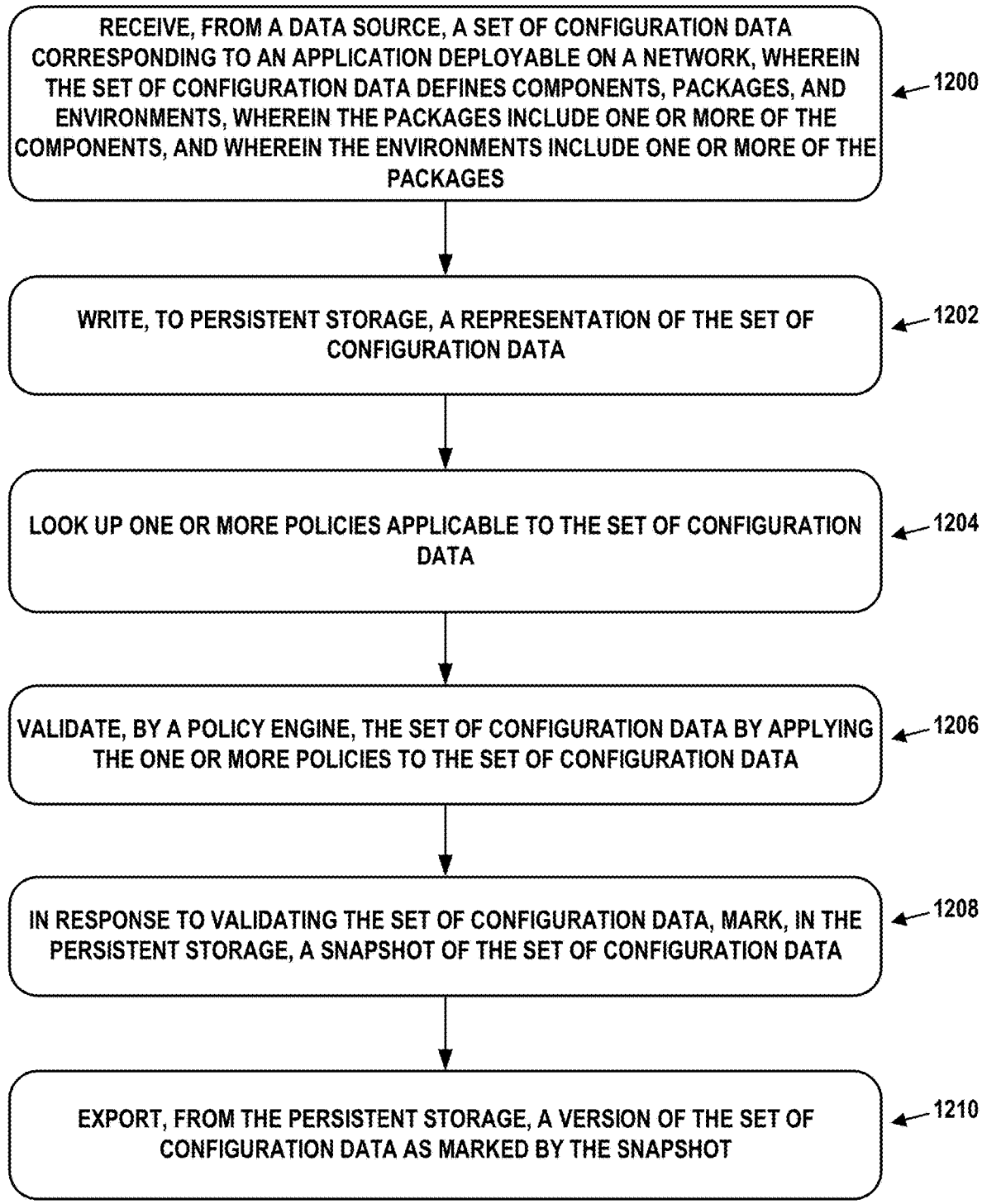
FIG. 12 is a flow chart, in accordance with example embodiments.

FIG. 12 is a flow chart illustrating an example embodiment. The process illustrated by FIG. 12 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 12 may be simplified by the removal of any one or more of the features shown therein. Further, these embodiments may be combined with features, aspects, and/or implementations of any of the previous figures or otherwise described herein.

Block 1200 may involve receiving, from a data source, a set of configuration data corresponding to an application deployable on a network, wherein the set of configuration data defines components, packages, and environments, wherein the packages include one or more of the components, and wherein the environments include one or more of the packages.

Block 1202 may involve writing, to persistent storage, a representation of the set of configuration data.

Block 1204 may involve looking up one or more policies applicable to the set of configuration data. This looking up may take place by way of a policy engine.

Block 1206 may involve validating, by the policy engine, the set of configuration data by applying the one or more policies to the set of configuration data.

Block 1208 may involve, possibly in response to validating the set of configuration data, marking, in the persistent storage, a snapshot of the set of configuration data.

Block 1210 may involve exporting, from the persistent storage, a version of the set of configuration data as marked by the snapshot.

In some embodiments, variables defined in the packages override variables defined in the components that have a common name.

In some embodiments, variables defined in the environments override variables defined in the packages that have a common name or defined in the components that have the common name.

In some embodiments, the data source is a source code repository, wherein the version of the set of configuration data as marked by the snapshot is exported to the source code repository.

In some embodiments, the data source is a plugin of a development operations tool, wherein the one or more processors are further configured to, in response to validating the set of configuration data, provide, by way of a development operations event handler and to the plugin, a notification that the set of configuration data has been validated.

In some embodiments, validating the set of configuration data comprises determining that individual elements of the set of configuration data are properly formatted or have pre-defined values.

In some embodiments, validating the set of configuration data comprises determining that groups of individual elements of the set of configuration data have combinations of values that are valid with one another.

In some embodiments, the persistent storage is also configured to store representations of hardware and software disposed on the network as configuration items, wherein the configuration items have attributes that were remotely discovered by way of probing devices on the network, and wherein validating the set of configuration data comprises determining that a particular element of the set of configuration data appears as an attribute of one of the configuration items.

In some embodiments, determining that the particular element of the set of configuration data appears as the attribute of one of the configuration items comprises determining that the attribute has been discovered no more than a pre-defined threshold number of hours, days, weeks, or months in the past.

In some embodiments, the one or more processors are further configured to: allow, by way of a graphical user interface, a human user to edit the set of configuration data prior to validation; and tag edits to the set of configuration data as a changeset.

In some embodiments, the one or more processors are further configured to receive the sets of configuration data asynchronously and at least partially in parallel to other processing of the sets of configuration data.

In some embodiments, the set of configuration data is arranged as nodes in a tree, and wherein writing the representation of the set of configuration data comprises storing the set of configuration data in a single table, wherein each row of the single table represents one of the nodes, wherein a particular row for a particular node of the nodes contains a unique identifier for the particular node, a value of the particular node when applicable, and a specification of a path from a root node of the nodes to the particular node, wherein the path shares a common prefix with a parent node of the particular node and any sibling nodes of the particular node.

In some embodiments, the path is specified as a sequence of labels separated by delimiters, wherein each of the labels is expressed as a unique value in a base-n symbolic notation, wherein n is greater than 16, and wherein the base-n symbolic notation includes only displayable characters. The value of n may be between 17 and 64, for example, and the displayable characters may include alphabetical characters, numeric character, and/or punctuation or special characters.

In some embodiments, each row of the single table also represents a time period related to the associated node, wherein the one or more processors are further configured to: add a further row to the single table, wherein the further row also represents the particular node, wherein a first time period specified in the particular row is disjoint from a second time period specified in the further row; and indicate in the particular row, that the particular row has been superseded.

In some embodiments, each row of the single table also represents a changeset related to the associated node, wherein a first changeset specified in the particular row is different from a second changeset specified in the further row.

Figure 13:
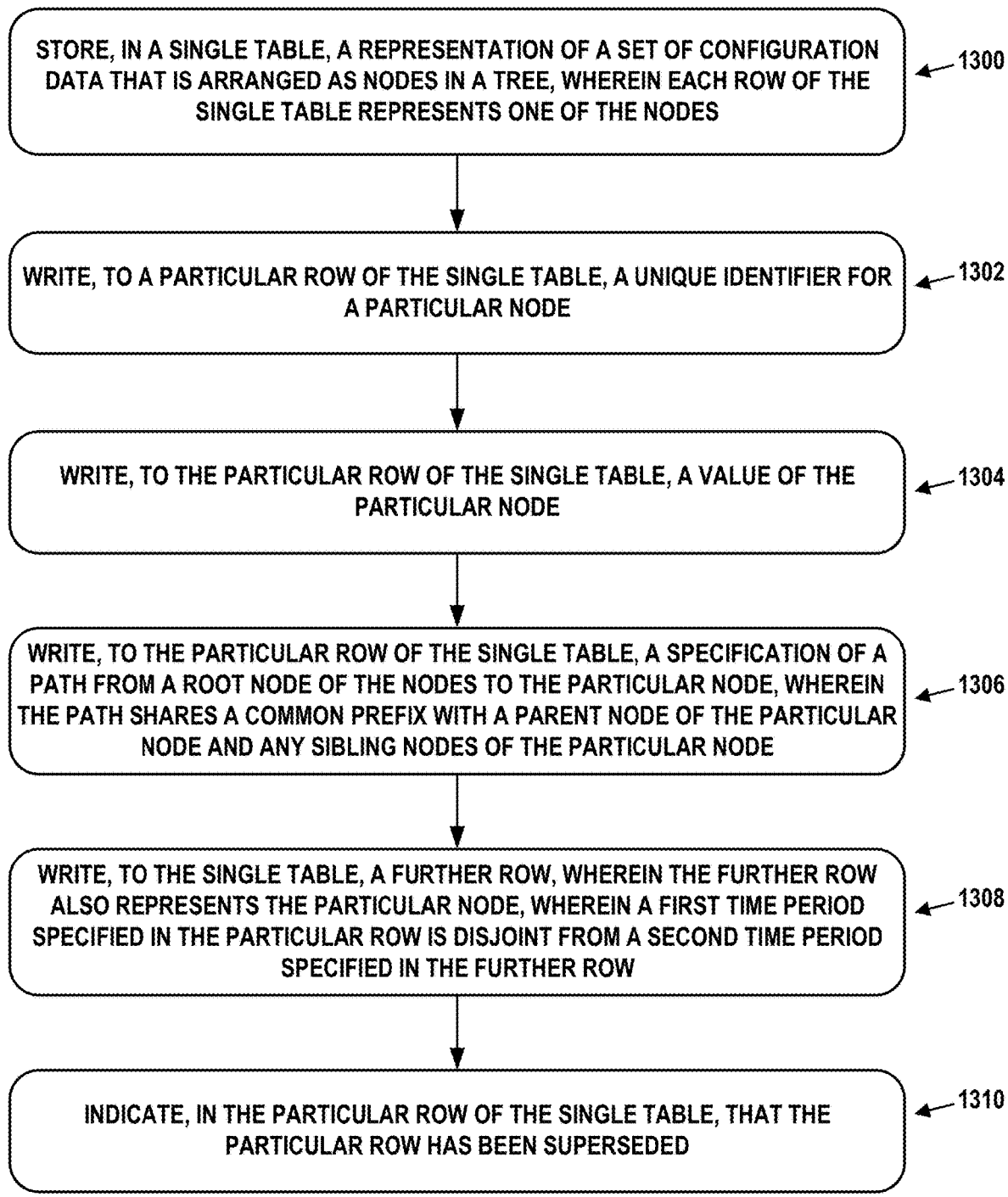
FIG. 13 is a flow chart, in accordance with example embodiments.

FIG. 13 is a flow chart illustrating an example embodiment. The process illustrated by FIG. 13 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 13 may be simplified by the removal of any one or more of the features shown therein. Further, these embodiments may be combined with features, aspects, and/or implementations of any of the previous figures or otherwise described herein.

Block 1300 may involve storing, in a single table, a representation of a set of configuration data that is arranged as nodes in a tree, wherein each row of the single table represents one of the nodes.

Block 1302 may involve writing, to a particular row of the single table, a unique identifier for a particular node.

Block 1304 may involve writing, to the particular row of the single table, a value of the particular node.

Block 1306 may involve writing, to the particular row of the single table, a specification of a path from a root node of the nodes to the particular node, wherein the path shares a common prefix with a parent node of the particular node and any sibling nodes of the particular node.

Block 1308 may involve writing, to the single table, a further row, wherein the further row also represents the particular node, wherein a first time period specified in the particular row is disjoint from a second time period specified in the further row.

Block 1310 may involve indicating, in the particular row of the single table, that the particular row has been superseded.

VII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
persistent storage arranged to store sets of configuration data respectively corresponding to applications; and
one or more processors of a computational instance configured to:
receive, from a data source, a set of configuration data corresponding to an application deployable on a network related to the computational instance, wherein the set of configuration data defines components, packages, and environments, wherein the packages include one or more of the components, and wherein the environments include one or more of the packages;
write, to the persistent storage, a representation of the set of configuration data, wherein the set of configuration data is arranged as nodes in a tree in which a path from a root node to a particular node is specified as a sequence of labels separated by delimiters, wherein each of the labels is expressed as a unique value in a base-n symbolic notation, wherein n is greater than 16, and wherein the base-n symbolic notation includes only displayable characters;
look up one or more policies applicable to the set of configuration data;
validate, by a policy engine, the set of configuration data by applying the one or more policies to the set of configuration data;
in response to validating the set of configuration data, mark, in the persistent storage, a snapshot of the set of configuration data; and
export, from the persistent storage, a version of the set of configuration data as marked by the snapshot.

2. The system of claim 1, wherein variables defined in the packages override variables defined in the components that have a common name.

3. The system of claim 1, wherein variables defined in the environments override variables defined in the packages that have a common name or defined in the components that have the common name.

4. The system of claim 1, wherein the data source is a source code repository, and wherein the version of the set of configuration data as marked by the snapshot is exported to the source code repository.

5. The system of claim 1, wherein the data source is a plugin of a development operations tool, and wherein the one or more processors are further configured to:
- in response to validating the set of configuration data, provide, by way of a development operations event handler and to the plugin, a notification that the set of configuration data has been validated.

6. The system of claim 1, wherein validating the set of configuration data comprises determining that individual elements of the set of configuration data are properly formatted or have pre-defined values.

7. The system of claim 1, wherein validating the set of configuration data comprises determining that groups of individual elements of the set of configuration data have combinations of values that are valid with one another.

8. The system of claim 1, wherein the persistent storage is also configured to store representations of hardware and software disposed on the network as configuration items, wherein the configuration items have attributes that were remotely discovered by way of probing devices on the network, and wherein validating the set of configuration data comprises determining that a particular element of the set of configuration data appears as an attribute of one of the configuration items.

9. The system of claim 8, wherein determining that the particular element of the set of configuration data appears as the attribute of one of the configuration items comprises determining that the attribute has been discovered no more than a pre-defined threshold number of hours, days, weeks, or months in the past.

10. The system of claim 1, wherein the one or more processors are further configured to:
- allow, by way of a graphical user interface, a human user to edit the set of configuration data prior to validation; and
- tag edits to the set of configuration data as a changeset.

11. The system of claim 1, wherein the one or more processors are further configured to receive the sets of configuration data asynchronously and at least partially in parallel to other processing of the sets of configuration data.

12. The system of claim 1, wherein writing the representation of the set of configuration data comprises:
- storing the set of configuration data in a single table, wherein each row of the single table represents one of the nodes, wherein a particular row for a particular node of the nodes contains a unique identifier for the particular node, a value of the particular node when applicable, and.

13. The system of claim 12, wherein each row of the single table also represents a time period related to the associated node, and wherein the one or more processors are further configured to:
- add a further row to the single table, wherein the further row also represents the particular node, wherein a first time period specified in the particular row is disjoint from a second time period specified in the further row; and
- indicate in the particular row, that the particular row has been superseded.

14. The system of claim 13, wherein each row of the single table also represents a changeset related to the associated node, and wherein a first changeset specified in the particular row is different from a second changeset specified in the further row.

15. A computer-implemented method comprising:
- receiving, from a data source, a set of configuration data corresponding to an application deployable on a network, wherein the set of configuration data defines components, packages, and environments, wherein the packages include one or more of the components, and wherein the environments include one or more of the packages;
- writing, to persistent storage, a representation of the set of configuration data, wherein the set of configuration data is arranged as nodes in a tree in which a path from a root node to a particular node is specified as a sequence of labels separated by delimiters, wherein each of the labels is expressed as a unique value in a base-n symbolic notation, wherein n is greater than 16, and wherein the base-n symbolic notation includes only displayable characters;
- looking up one or more policies applicable to the set of configuration data;
- validating, by a policy engine, the set of configuration data by applying the one or more policies to the set of configuration data;
- in response to validating the set of configuration data, marking, in the persistent storage, a snapshot of the set of configuration data; and
- exporting, from the persistent storage, a version of the set of configuration data as marked by the snapshot.

16. The computer-implemented method of claim 15, wherein validating the set of configuration data comprises determining that groups of individual elements of the set of configuration data have combinations of values that are valid with one another.

17. The computer-implemented method of claim 15, wherein the persistent storage is also configured to store representations of hardware and software disposed on the network as configuration items, wherein the configuration items have attributes that were remotely discovered by way of probing devices on the network, and wherein validating the set of configuration data comprises determining that a particular element of the set of configuration data appears as an attribute of one of the configuration items.

18. The computer-implemented method of claim 15, wherein the set of configuration data is arranged as nodes in a tree, and wherein writing the representation of the set of configuration data comprises:
- storing the set of configuration data in a single table, wherein each row of the single table represents one of the nodes, wherein a particular row for a particular node of the nodes contains a unique identifier for the particular node, a value of the particular node when applicable, and a specification of a path from a root node of the nodes to the particular node, wherein the path shares a common prefix with a parent node of the particular node and any sibling nodes of the particular node.

19. A computer-implemented method comprising:
- storing, in a single table, a representation of a set of configuration data that is arranged as nodes in a tree, wherein each row of the single table represents one of the nodes;
- writing, to a particular row of the single table, a unique identifier for a particular node;
- writing, to the particular row of the single table, a value of the particular node;

writing, to the particular row of the single table, a specification of a path from a root node of the nodes to the particular node, wherein the path shares a common prefix with a parent node of the particular node and any sibling nodes of the particular node, and wherein the path is specified as a sequence of labels separated by delimiters, wherein each of the labels is expressed as a unique value in a base-n symbolic notation, wherein n is greater than 16, and wherein the base-n symbolic notation includes only displayable characters;

writing, to the single table, a further row, wherein the further row also represents the particular node, wherein a first time period specified in the particular row is disjoint from a second time period specified in the further row; and indicating, in the particular row of the single table, that the particular row has been superseded.

\* \* \* \* \*